United States Patent
Sugiyama et al.

(10) Patent No.: US 12,428,568 B2
(45) Date of Patent: Sep. 30, 2025

(54) LAMINATE HAVING INORGANIC NANOPARTICLE-CONTAINING SURFACE LAYER THAT EXHIBITS APPEARANCE WITH LOW GLOSS AND INORGANIC NANOPARTICLE-CONTAINING RADIATION-CURABLE INK

(71) Applicant: 3M INNOVATIVE PROPERTIES COMPANY, St. Paul, MN (US)

(72) Inventors: Naota Sugiyama, Kanagawa (JP); Katsuya Ono, Yamagata (JP); Richard J. Pokorny, Maplewood, MN (US); Taiki Ihara, Tokyo (JP); Hiroki Hayashi, Kanagawa (JP); Sonja S. Mackey, St. Paul, MN (US); Hideyuki Hatanaka, Tokyo (JP)

(73) Assignee: 3M Innovative Properties Company, St. Paul, MN (US)

( * ) Notice: Subject to any disclaimer, the term of this patent is extended or adjusted under 35 U.S.C. 154(b) by 288 days.

(21) Appl. No.: 17/754,876

(22) PCT Filed: Nov. 17, 2020

(86) PCT No.: PCT/IB2020/060820
§ 371 (c)(1),
(2) Date: Apr. 14, 2022

(87) PCT Pub. No.: WO2021/099939
PCT Pub. Date: May 27, 2021

(65) Prior Publication Data
US 2024/0101839 A1    Mar. 28, 2024

(30) Foreign Application Priority Data
Nov. 20, 2019    (JP) .................................. 2019-209807

(51) Int. Cl.
*C09D 11/101*    (2014.01)
*C09D 11/102*    (2014.01)

(52) U.S. Cl.
CPC .......... *C09D 11/101* (2013.01); *C09D 11/102* (2013.01)

(58) Field of Classification Search
CPC ............................ C09D 11/101; C09D 11/102
See application file for complete search history.

(56) References Cited

U.S. PATENT DOCUMENTS

| 7,156,547 B2 | 1/2007 | Toshima et al. |
| 2003/0054116 A1 | 3/2003 | Dawson et al. |

(Continued)

FOREIGN PATENT DOCUMENTS

| EP | 2277956 A1 | 1/2011 |
| JP | 3312437 B2 | 8/2002 |

(Continued)

OTHER PUBLICATIONS

Machin Translation of JP 2013-241515 A (Year: 2013).*

(Continued)

*Primary Examiner* — Mark Ruthkosky
*Assistant Examiner* — Sathavaram I Reddy

(57) ABSTRACT

[Object] To provide a laminate having inorganic nanoparticle-containing surface layer that exhibits a low gloss appearance and inorganic nanoparticle-containing radiation-curable ink. [Resolution Means] A laminate of an embodiment of the present disclosure has a substrate and a surface layer containing a cured product of a radiation-curable ink, the radiation-curable ink containing inorganic nanoparticles, a polyether-modified polymer, and at least one selected from the group consisting of a radiation-curable polymerizable (Continued)

oligomer and a radiation-curable polymerizable monomer, and the surface layer having a 60° surface glossiness of 50.0 GU or less.

16 Claims, 6 Drawing Sheets

(56) References Cited

U.S. PATENT DOCUMENTS

| | | | |
|---|---|---|---|
| 2011/0028586 A1 | 2/2011 | Kito et al. | |
| 2016/0145449 A1* | 5/2016 | Hilgers | C09D 4/00 522/18 |
| 2020/0087474 A1* | 3/2020 | Kashihara | H05K 1/038 |
| 2021/0040339 A1 | 2/2021 | Takizawa et al. | |

FOREIGN PATENT DOCUMENTS

| | | |
|---|---|---|
| JP | 3743624 B2 | 2/2006 |
| JP | 4209703 B2 | 1/2009 |
| JP | 2011255552 A | 12/2011 |
| JP | 2013241515 A | 12/2013 |
| JP | 2016165824 A | 9/2016 |
| JP | 2019072935 A | 5/2019 |
| WO | 2009139455 A1 | 11/2009 |
| WO | 2013176279 A1 | 12/2014 |
| WO | 2014207103 A1 | 12/2014 |
| WO | 2016036507 A1 | 3/2016 |
| WO | 2016096632 A1 | 6/2016 |
| WO | 2018235748 A1 | 12/2018 |
| WO | 2019077502 A2 | 4/2019 |
| WO | 2019138397 A1 | 7/2019 |
| WO | 2020212780 A1 | 10/2020 |

OTHER PUBLICATIONS

Xiaoyan, "PVC Wood-Plastic Composites", Beijing Jiaotong University Press, Apr. 2014, ISBN 978-7-5121-1871-3, pp. 1-3.
Yunlin et al., "Research on Improving Surface Properties of Wooden Materials through Silicon Dioxide", China Environmental Science Press, Oct. 2011, ISBN 978-7-5111-0697-1, pp. 1-5.
International Search Report for PCT/IB2020/060820 mailed on Feb. 4, 2021, 5 pages.

* cited by examiner

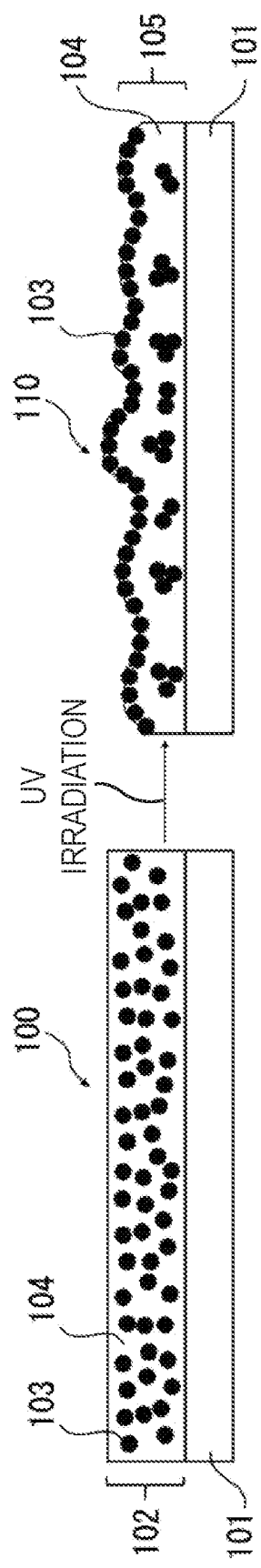

10.0μm 5.0μm 10.0μm 5.0μm

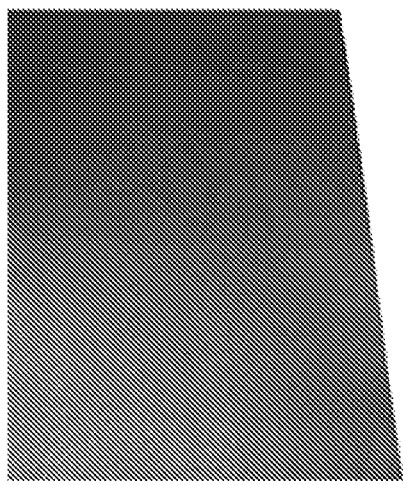
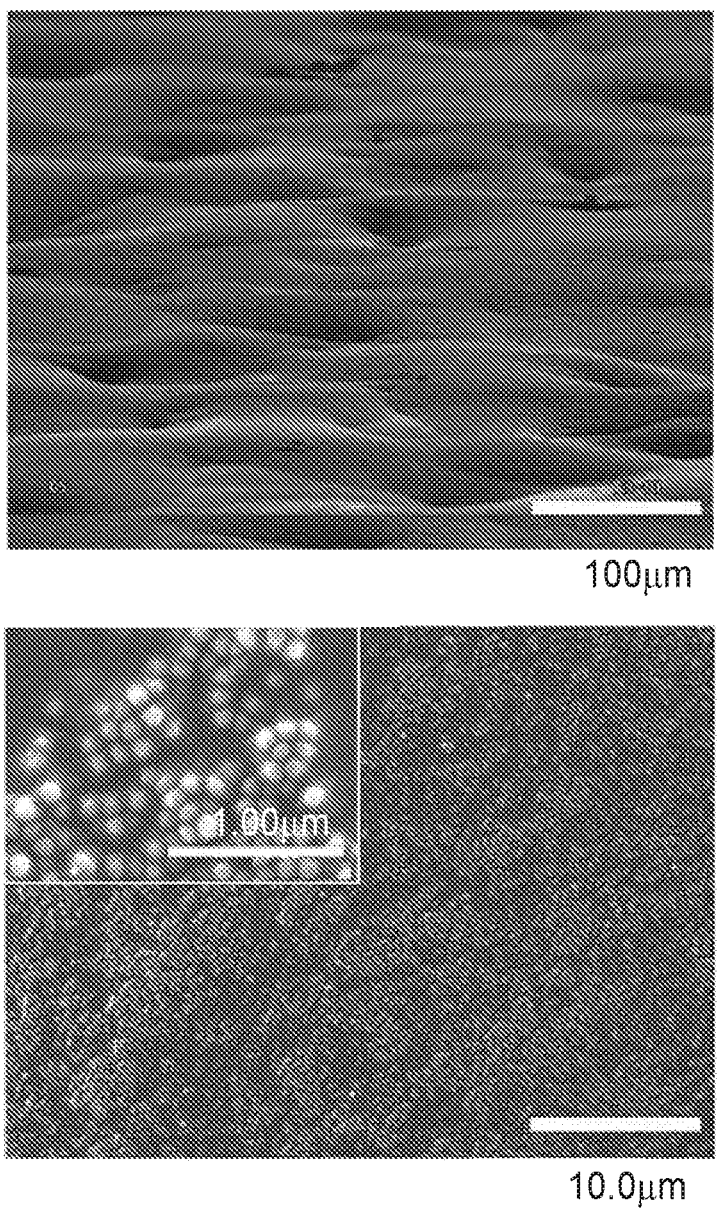
Product of Embodiment of Present Invention
FIG. 5B

LAMINATE HAVING INORGANIC NANOPARTICLE-CONTAINING SURFACE LAYER THAT EXHIBITS APPEARANCE WITH LOW GLOSS AND INORGANIC NANOPARTICLE-CONTAINING RADIATION-CURABLE INK

CROSS REFERENCE TO RELATED APPLICATIONS

This application is a national stage filing under 35 U.S.C. 371 of PCT/IB2020/060820, filed Nov. 17, 2020, which claims the benefit of Japan Patent Application No. 2019-209807, filed Nov. 20, 2019, the disclosure of which is incorporated by reference in its/their entirety herein.

TECHNICAL FIELD

The present disclosure relates to a laminate containing a surface layer exhibiting an appearance with low gloss and a radiation-curable ink.

BACKGROUND

For example, in a display device such as a liquid crystal display, a light diffusion sheet has been used for suppressing reduction in visibility of the display. Furthermore, for example, decorative films, which have been subjected to embossment, to decorate interior and exterior of buildings and vehicles have been also known.

Patent Document 1 (JP 3743624 B) describes a light diffusion sheet having a light diffusion layer formed from a resin film layer in which fine protrusions and recesses are formed on a surface, the light diffusion layer having a value of 60° glossiness (JIS Z8741) of the fine protruded and recessed surface varying based on an incident direction, and a maximum value (A) and a minimum value (B) of the glossiness satisfying an expression: $(A-B) > \{(A+B)/2\} \times 0.1$.

Patent Document 2 (JP 2011-255552 A) describes an embossed decorative sheet formed by performing embossment on a surface of a decorative sheet, a surface protection layer formed from a curable resin containing synthetic resin beads being formed on a decorative sheet surface side, an average amplitude of the embossment being from 15 to 50 μm, and the synthetic resin beads having an average particle size of from 8 to 20 μm.

Patent Document 3 (JP 2019-072935 A) describes a stretchable film having a surface layer containing a binder containing a urethane resin, urethane resin beads having an average particle size of from 4 to 20 μm, and nanosilica particles, a surface glossiness at 60° being 5 GU or less.

In recent years, films having an appearance with low gloss has been required for, for example, optical use and decorative use. In the case where a low gloss appearance is exhibited by a mechanical means, such as embossment, maintenance and management of a device such as an embossing roll is required, and also embossing rolls are required for each low gloss appearance, and thus cost has increased.

Techniques, in which, for example, resin beads are blended in an ink and a surface of a printed layer or a coated layer is thus roughened, have been also known; however, excellent low gloss appearance may not be exhibited due to sedimentation of the resin beads in the layer. In recent years, although a low gloss layer can be produced by inkjet, it has been difficult to achieve low gloss because resin beads cannot be used due to restriction caused by an inkjet head size and also because of restriction of viscosity.

SUMMARY

The present disclosure provides a laminate having an inorganic nanoparticle-containing surface layer that exhibits an appearance with low gloss and an inorganic nanoparticle-containing radiation-curable ink.

According to an embodiment of the present disclosure, a laminate having a substrate and a surface layer containing a cured product of a radiation-curable ink, the radiation-curable ink containing inorganic nanoparticles, a polyether-modified polymer, and at least one selected from the group consisting of a radiation-curable polymerizable oligomer and a radiation-curable polymerizable monomer, and the surface layer having a 60° surface glossiness of 50.0 GU or less, is provided.

According to another embodiment of the present disclosure, a radiation-curable ink containing inorganic nanoparticles, a polyether-modified polymer, and at least one selected from the group consisting of a radiation-curable polymerizable oligomer and a radiation-curable polymerizable monomer is provided.

According to the present disclosure, a laminate having inorganic nanoparticle-containing surface layer that exhibits an appearance with low gloss and an inorganic nanoparticle-containing radiation-curable ink can be provided.

Note that the above description should not be construed to mean that all embodiments of the present invention and all advantages related to the present invention are disclosed.

BRIEF DESCRIPTION OF THE DRAWINGS

FIG. 1(a) is a schematic cross-sectional view of a laminate of an embodiment of the present disclosure before irradiation and FIG. 1(b) is a schematic cross-sectional view of the laminate after the irradiation.

In FIG. 5(b), the upper right is an SEM photograph of a laminate surface of Example 14 having a protruded and recessed surface layer of an embodiment of the present disclosure prepared by using an inkjet ink containing a polyether-modified polymer and inorganic nanoparticles, at an angle of inclination of 10°; the lower right is an SEM photograph of a top face of this protruded and recessed surface layer; and the left side is an optical photograph of the laminate surface of Example 14 having a surface layer prepared by using the ink of the present disclosure.

DETAILED DESCRIPTION

Figure 2A:
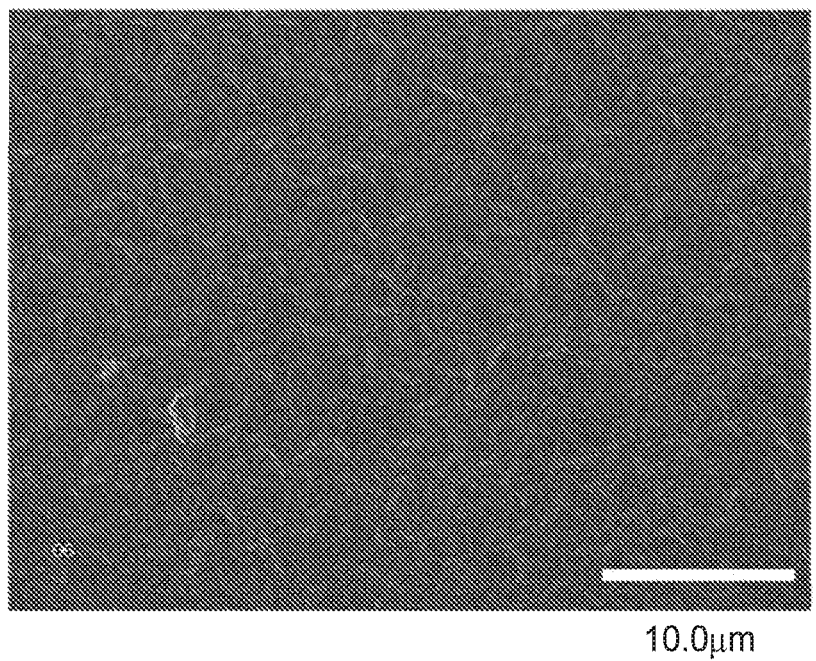
FIG. 2(a) is an SEM photograph of a laminate top face of Comparative Example 1 having a surface layer containing a polyether-modified polymer but no inorganic nanoparticles and FIG. 2(b) is an SEM photograph of a surface layer cross section of the laminate of Comparative Example 1.

Hereinafter, the present invention will be described in more detail to exemplify representative embodiments of the present invention, but the present invention is not limited to these embodiments.

In the present disclosure, "nanoparticle" refers to a particle having a size of nanometer order, that is, less than 1000 nm.

In the present disclosure, "radiation-curable" refers to a property that allows curing by radiation, such as UV radiation, electron beam, and X-ray.

In the present disclosure, "non-functional" refers to a property that does not undergo curing reaction with, for example, a compound represented by Formula (1) or a radiation-curable oligomer or monomer contained in the ink even when exposure to radiation takes place.

In the present disclosure, "(meth)acryl" means acryl or methacryl, "(meth)acrylate" means acrylate or methacrylate, and "(meth)acryloyl" means "acryloyl" or "methacryloyl".

In the present disclosure, "monofunctional monomer" refers to a compound having only one functional group that is reactive and typically has a weight average molecular weight of less than 1000.

In the present disclosure, "oligomer" refers to a compound having a plurality of units derived from a monomer and typically has a weight average molecular weight of 500 or greater or 1000 or greater. For example, "urethane (meth)acrylate oligomer" is a compound containing a plurality of units having a urethane bond and containing a (meth)acryloyloxy group.

In the present disclosure, for example, "on" as in "a decorative layer is disposed on a substrate" is intended to mean that the decorative layer is disposed directly on a top side of the substrate, or that the decorative layer is indirectly disposed on a top side of the substrate with another layer interposed between the decorative layer and the substrate.

In the present disclosure, for example, "below" as in "an adhesive layer disposed below a substrate" is intended to mean that the adhesive layer being disposed directly on a bottom side of the substrate, or the adhesive layer being indirectly disposed on a bottom side of the substrate film with another layer interposed between the adhesive layer and the substrate film.

In the present disclosure, "film" also includes an article referred to as a "sheet".

In the present disclosure, the term "substantially" refers to including variations caused by for instance manufacturing errors and is intended to mean that approximately +1-20% variation is acceptable.

In the present disclosure, "transparent" means that an average transmittance in a visible light region (wavelength from 400 nm to 700 nm) measured in accordance with JIS K 7375 is 80% or greater, and may be desirably 85% or greater, or 90% or greater.

In the present disclosure, "translucent" means that an average transmittance in a visible light region (wavelength from 400 nm to 700 nm) measured in accordance with JIS K 7375 is less than 80%, and may be desirably 75% or less, and may be 10% or greater, or 20% or greater, and is intended to mean that an underlying layer is not completely hidden.

A laminate of the present disclosure will be described with reference to the drawings.

FIG. 1 is a cross-sectional view related to a laminate 100 according to an embodiment of the present disclosure before irradiation and a laminate 110 after the irradiation. A laminate 100 of FIG. 1(a) has a surface layer 102 on a substrate 101 before irradiation, and a laminate 110 of FIG. 1(b) has a surface layer 105 on a substrate 101 after the irradiation. Each of the surface layers contains inorganic nanoparticles 103 and a binder resin 104 obtained by curing at least one selected from the group consisting of a radiation-curable polymerizable oligomer and a radiation-curable polymerizable monomer.

To exemplify representative embodiments of the present disclosure, details of the structural components are described below with some of the reference signs being omitted.

The laminate of the present disclosure has a surface layer prepared from a radiation-curable ink containing inorganic nanoparticles, a polyether-modified polymer, and at least one selected from the group consisting of a radiation-curable polymerizable oligomer and a radiation-curable polymerizable monomer.

In the radiation-curable ink of the present disclosure, the inorganic nanoparticles are not substantially aggregated and united in the ink. In the case where the ink is applied to a substrate surface, the inorganic nanoparticles can be substantially uniformly dispersed in the surface layer as shown in FIG. 1(a). Unexpectedly, the present inventors found that a low gloss appearance can be exhibited when a radiation-curable ink containing inorganic nanoparticles and a polyether-modified polymer is employed, because at least a part of the inorganic nanoparticles in a surface layer applied to a substrate surface transfers in close proximity to a surface of the surface layer due to irradiation, as shown in FIG. 1(b).

The radiation-curable ink of the present disclosure is less likely to cause aggregation and unification of the inorganic nanoparticles in the ink and thus can reduce or prevent clogging of, for example, a discharging nozzle of the ink or a wire wound around a coating roll. For example, for a known ink that exhibits a low gloss appearance by blending coarse particles having a size of micrometer order, printing methods or coating methods have been limited, and for example, an inkjet printing method could not be employed. However, the radiation-curable ink of the present disclosure can allow particles to be aggregated or gathered closely to be coarsened after application to a substrate, does not have any limitation on the printing methods or coating methods, and is advantageous from the perspective of, for example, productivity.

The inorganic nanoparticles to be used are not particularly limited. For example, at least one type of particles selected from the group consisting of silica, alumina, titanium oxide, zinc oxide, zirconium oxide, tin-doped indium oxide, cesium tungstate, and antimony-doped tin oxide can be used. Among these, for example, from the perspectives of interaction with an optional compound represented by Formula (1) or non-functional silane coupling agent that can be contained in the ink, exhibition of a low gloss appearance after irradiation, and wear resistance, silica nanoparticles are preferred. Here, in the present disclosure, "inorganic nanoparticles" do not include, for example, inorganic pigments that are used in inkjet inks, such as carbon black.

As silica nanoparticles, for example, a silica sol obtained by using water glass (sodium silicate solution) as a starting material can be used. For example, in the case where a dispersion liquid, in which silica nanoparticles are dispersed in, for example, isopropanol, is used, from the perspective of exhibition of a low gloss appearance after irradiation or from the perspective of reducing or preventing problems of the ink, such as gelling, the dispersion liquid of the starting material preferably contains trace amount of or no acid components, alkali components, and ion components, especially ammonia, acetic acid, hydrochloric acid, sodium ion, potassium ion, and calcium ion. Thus, the content of acid components, alkali components, and ion components, especially ammonia, acetic acid, hydrochloric acid, sodium ion, potassium ion, and calcium ion, in the ink prepared by using the dispersion liquid or in the surface layer formed by the ink is preferably 500 ppm or less, 300 ppm or less, 100 ppm or less, 10 ppm or less, or 1 ppm or less, relative to a solid total weight of the ink or relative to a total weight (dry coating amount) of the surface layer, and more preferably these components are not contained.

From the perspective of exhibition of a low gloss appearance after irradiation or from the perspective of reducing or preventing gelling of the ink, the advantageous silica nanoparticles in the dispersion liquid is unmodified particles, in which the surface is not modified by a surface treatment agent, such as silane, amine, carboxylic acid, sulfonic acid, phosphonic acid, and titanate, and, as the dispersion liquid, isopropanol is advantageously used. For the dispersion liquid containing the unmodified silica nanoparticles having acid components, alkali components, and ion components within the range described above, a commercially available product can be used, and examples thereof include IPA-ST, IPA-ST-L, and IPA-ST-ZL, available from Nissan Chemical Industries, Ltd.

The compounded amount of the inorganic nanoparticles is not particularly limited and, for example, can be appropriately adjusted based on the required low gloss appearance and the viscosity of the ink. The compounded amount of the inorganic nanoparticles can be 2 mass % or greater, 4 mass % or greater, or 6 mass % or greater, and 20 mass % or less, 15 mass % or less, or 10 mass % or less, relative to the total weight (dry coating amount) of the surface layer or the total weight (solid content) of the ink.

The low gloss appearance typically tends to be affected by fine protrusions and recesses due to inorganic nanoparticles on a surface of a surface layer rather than inorganic nanoparticles inside of the surface layer. Because the radiation-curable ink of the present disclosure can allow the inorganic nanoparticles contributing to a low gloss appearance to transfer in close proximity to a surface of the surface layer by irradiation, the used amount of the inorganic nanoparticles can be reduced, compared to the case of inorganic nanoparticle-containing ink with no such performance. As a result, the radiation-curable ink of the present disclosure can contribute to reduction in production cost and enhancement of elongation properties, for example.

The average particle size of the inorganic nanoparticles is not particularly limited and, for example, can be 5 nm or greater, 7 nm or greater, 10 nm or greater, 12 nm or greater, 20 nm or greater, 30 nm or greater, or 50 nm or greater, and can be 150 nm or less, 120 nm or less, or 100 nm or less, from the perspectives of exhibition of a low gloss appearance, dischargeability from an inkjet nozzle, and coatability. The average particle size of the inorganic nanoparticles is an average value of diameters of 10 or more particles, for example, from 10 to 100 particles, measured using a transmission electron microscope (TEM).

Because the radiation-curable ink of the present disclosure contains a polyether-modified polymer, the inorganic nanoparticles can be transferred in close proximity to a surface the surface layer by irradiation.

The polyether-modified polymer is not particularly limited and, for example, a polyether-modified polymer containing a siloxane bond can be used. Examples of such a polymer include polyether-modified siloxane polymers, such as "TEGO (trade name) Flow 425", available from Evonik Industries; polyether-modified polydimethylsiloxane, such as "BYK-UV3510", available from BYK-Chemie Japan K. K.; polyether-modified polysiloxane or polyether-modified polydimethylsiloxane having one or a plurality of (meth)acrylic functional groups, such as "BYK-UV3500", "BYK-UV3505", "BYK-UV3530", "BYK-UV3570", "BYK-UV3575", and "BYK-UV3576", available from BYK-Chemie Japan K. K.; and silicone (meth) acrylate, such as "TEGO (trade name) Rad 2250", "TEGO (trade name) Rad 2300", and "TEGO (trade name) Rad 2600", available from Evonik Industries. In addition, a silicone-free modified polyether having no siloxane bond, such as "BYK-UV3535" available from BYK-Chemie Japan K. K., can be used. The content of the polyether-modified polymer in the radiation-curable ink or in a surface layer formed by the ink is not particularly limited. For example, from the perspective of exhibition of a low gloss appearance, the content can be 0.5 parts by mass or greater, 0.8 parts by mass or greater, 1.0 part by mass or greater, 3.0 parts by mass or greater, 5.0 parts by mass or greater, 7.0 parts by mass or greater, 10 parts by mass or greater, 15 parts by mass or greater, or 20 parts by mass or greater, relative to the total weight (solid content) of the ink or relative to 100 parts by mass of the inorganic nanoparticles. The upper limit of the content of the polyether-modified polymer is not particularly limited and, for example, can be 50 parts by mass or less, 40 parts by mass or less, 35 parts by mass or less, or 30 parts by mass or less.

The principle behind the exhibition of a low gloss appearance by irradiation made possible by the use of a polyether-modified polymer is not known but it is conceived as follows. For example, from the photographs of FIG. 4, it is conceived that the surface energy of the inorganic nanoparticles changes due to the irradiation, and the polyether-modified polymer acts on the particle surfaces to promote aggregation or gathering of the inorganic nanoparticles. Thus, it is conceived that this is originated in the fact that the surface-direction transfer rate of the aggregated or gathered inorganic nanoparticles is slower than the curing rate inside the surface layer, because the curing rate of the radiation-curable oligomer or monomer in close proximity to a surface of the surface layer is affected by, for example, oxygen in air atmosphere. That is, it is conceived that an aggregate of the inorganic nanoparticles formed around a substrate side from the inner part of the surface layer is retained at the place by a cured binder resin component immediately after irradiation. Meanwhile, it is conceived that an aggregate in close proximity to the surface of the surface layer can transfer close to the surface because the curing rate of the radiation-curable oligomer or the like is slow even after the irradiation. As a result, this transferred aggregate coarsens the surface layer in micrometer order, and the inorganic nanoparticles constituting the aggregate form fine protrusions and recesses in nanometer order on the surface of the surface layer, and thus it is conceived that excellent low gloss appearance shown in FIG. 5(b) can be achieved.

Figure 4A:
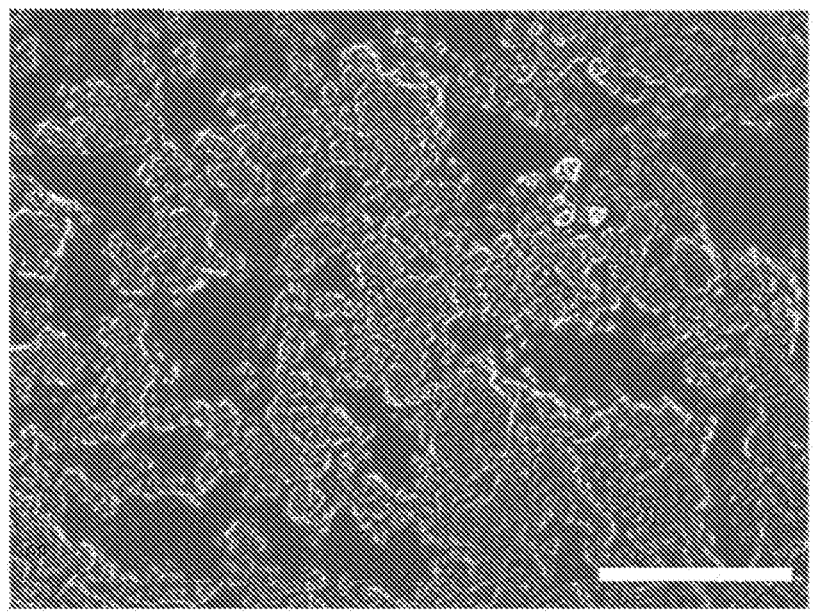
FIG. 4(a) is an SEM photograph of a laminate top face of Example 1 having a surface layer containing inorganic nanoparticles and a polyether-modified polymer and FIG. 4(b) is an SEM photograph of a surface layer cross section of the laminate of Example 1.
Figure 4B:
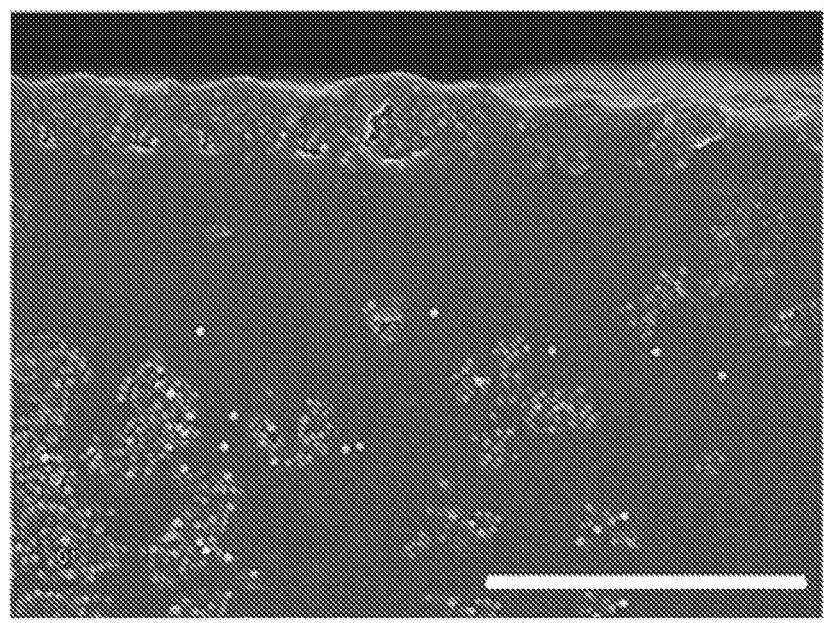

In one embodiment, as shown in FIG. 4(b), in the surface layer of the present disclosure after irradiation, the inorganic nanoparticles can be aggregated or gathered to cover a substantially entire surface of the surface layer while the inner part of the surface layer can have a distribution (that can be also referred to as "sea-island structure") including a part where aggregates of the inorganic nanoparticles are present (that can be also referred to as "island part") and a part where aggregates of the inorganic nanoparticles are absent (that can be also referred to as "sea part"). For example, in the case where a surface layer is prepared by using an ink, in which aggregates of inorganic nanoparticles are contained in advance, the aggregates are typically substantially uniformly distributed in the surface layer, and the surface layer does not have a structure shown in FIG. 4(b), that is, a structure in which the density of the aggregates is lower in, for example, a middle part which is beneath the proximity to the surface of the surface layer.

Note that, in the present disclosure, "aggregate" is intended to mean an aggregate or compacted body formed by, for example, gathering or concentrating 5 or more, 7 or more, or 10 or more primary particles of the inorganic nanoparticles. "Proximity to the surface of the surface layer" is intended to mean a region from an upper most part of the surface of the surface layer to a deepest part in a thickness direction in a part where the inorganic nanoparticles are aggregated or gathered. Furthermore, the density of the aggregates can be determined by measuring the cross-section of the surface layer in a thickness direction using a scanning electron microscope (SEM). For example, difference in the densities of the aggregates can be distinguished by observing presence or absence of a part, in which the aggregates are tightly arranged substantially continuously in a plane direction and a thickness direction of the surface layer and which is formed in close proximity to a surface of the surface layer.

The radiation-curable ink of the present disclosure containing at least one selected from the group consisting of a radiation-curable polymerizable oligomer and a radiation-curable polymerizable monomer.

In one embodiment, for example, from the perspectives of compatibility with the compound represented by Formula (1) described below and curing reactivity, it is advantageous for the radiation-curable ink to be a radical polymerization-type (meth)acrylic ink employing a (meth)acrylic radiation-curable polymerizable oligomer and radiation-curable polymerizable monomer. The surface layer formed by using a (meth)acrylic ink has, for example, excellent strength and weather resistance and is advantageous in the case where the laminate is used as an interior material of a decorative film.

In one embodiment, the radiation-curable ink contains a bifunctional urethane (meth)acrylate oligomer, which is a radiation-curable polymerizable oligomer, and optionally also contains a radiation-curable monofunctional monomer that can also function as a diluent. For example, with the inkjet printing method, purging with nitrogen is difficult due to the structure of the device and, typically, the ink is radiation cured in an air atmosphere. Compared to the polyfunctional monomer with tri- or higher-functionality, a bifunctional or monofunctional monomer or oligomer is typically easily affected by oxygen inhibition and is less likely to be cured in an air atmosphere. However, the ink containing a bifunctional urethane (meth)acrylate oligomer is easily cured even in an air atmosphere, and the cured binder resin component achieves, for example, excellent elongation properties and, for example, is advantageously used in an interior material of a decorative film of a laminate.

The bifunctional urethane (meth)acrylate oligomer is formed by introducing (meth)acryloyl groups into the both terminals of a urethane oligomer, which is a reaction product of diol and diisocyanate, and the (meth)acryloyl group reacts with another bifunctional urethane (meth)acrylate oligomer and a (meth)acryloyl group of the compound represented by Formula (1) or a monofunctional monomer, and thus a cured product is formed. The bifunctional urethane (meth)acrylate oligomer can impart flexibility, impact resistance at a low temperature of approximately from 0 to 10° C. (also simply referred to as "low temperature impact resistance") and chemical resistance to a cured product of the radiation-curable ink. One type of or a combination of two or more types of the bifunctional urethane (meth)acrylate oligomer may be used. For each of the diols and diisocyanates constituting the urethane oligomer, one type of or a combination of two or more types thereof may be used.

Examples of the diol include polyester polyols, polyether polyols, polycarbonate polyols, and polycaprolactone polyols.

The diol may contain a low molecular weight diol. Examples of the low molecular weight diol include ethylene glycol, diethylene glycol, propylene glycol, dipropylene glycol, 1,3-butane diol, 1,4-butane diol, 2-methyl-1,3-propane diol, 1,5-pentane diol, 1,6-hexane diol, neopentyl glycol, 1,4-cyclohexanedimethanol, bisphenol A, bisphenol F, hydrogenated bisphenol A, hydrogenated bisphenol F, 1,2-cyclopentane diol, and tricyclo$[5.2.1.0^{2,6}]$ decanedimethanol.

Examples of the diisocyanate include aliphatic isocyanates and aromatic isocyanates. Examples of the aliphatic isocyanate include tetramethylene diisocyanate, hexamethylene diisocyanate, 2,4,4-trimethylhexamethylene diisocyanate, 2,2,4-trimethylhexamethylene diisocyanate, decamethylene diisocyanate, 1,3-cyclohexane diisocyanate, 1,4-cyclohexane diisocyanate, isophorone diisocyanate, and 4,4'-methylene bis(cyclohexylisocyanate). Examples of the aromatic isocyanate include 2,4-toluene diisocyanate, 2,6-toluene diisocyanate, methylenediphenyl 4,4'-diisocyanate, 1,3-phenylene diisocyanate, 1,4-phenylene diisocyanate, 3,3'-dimethyldiphenylmethane-4,4'-diisocyanate, diphenylmethane-2,2'-diisocyanate, diphenylmethane-2,4'-diisocyanate, 4,4'-diisocyanato-3,3'-dimethylbiphenyl, 1,5-naphthalene diisocyanate, and 2-methyl-1,5-naphthalene diisocyanate.

By using aliphatic compounds for both the diol and the diisocyanate, weather resistance of a cured product of the radiation-curable ink and a surface layer containing the cured product can be enhanced.

The introduction of the (meth)acryloyl group can be performed by allowing a hydroxy group-containing (meth)acrylate to react with an isocyanato terminal of a urethane oligomer. Examples of the hydroxy group-containing (meth)acrylate include 2-hydroxyethyl acrylate, 2-hydroxyethyl methacrylate, 2-hydroxypropyl acrylate, 2-hydroxypropyl methacrylate, 2-hydroxybutyl acrylate, 2-hydroxybutyl methacrylate, dipropylene glycol monoacrylate, and dipropylene glycol monomethacrylate. The hydroxy group-containing (meth)acrylate can be used alone or in combination of two or more. In this embodiment, during synthesis of the urethane oligomer, an excessive amount of the diisocyanate is desirably used for the diol, that is, the molar ratio of NCO group/OH group is desirably greater than 1.

The introduction of the (meth)acryloyl group can be also performed by reacting an isocyanato group-containing (meth)acrylate to a hydroxy group terminal of a urethane oligomer. Examples of the isocyanato group-containing (meth)acrylate include 2-isocyanatoethyl acrylate and 2-isocyanatoethyl methacrylate. In this embodiment, during synthesis of the urethane oligomer, an excessive amount of the diol is desirably used for the diisocyanate, that is, the molar ratio of NCO group/OH group is desirably less than 1.

Examples of the bifunctional urethane (meth)acrylate oligomer include polyester urethane di(meth)acrylate oligomer, polycarbonate urethane di(meth)acrylate oligomer, and polyether urethane di(meth)acrylate oligomer.

For example, from the perspective of curability in an air atmosphere and elongation properties, it is advantageous for the bifunctional urethane (meth)acrylate oligomer to be a bifunctional aliphatic urethane acrylate oligomer. The bifunctional aliphatic urethane acrylate oligomer can provide a cured product having excellent weather resistance and a surface layer containing such a cured product.

The number average molecular weight Mn of the bifunctional urethane (meth)acrylate oligomer can be 500 or greater, 1000 or greater, or 1200 or greater, and 5000 or less, 4000 or less, or 3000 or less. The weight average molecular weight Mw of the bifunctional urethane (meth)acrylate oligomer can be 500 or greater, 1000 or greater, or 1200 or greater, and 5000 or less, 4000 or less, or 3000 or less. The number average molecular weight Mn and the weight average molecular weight Mw are values obtained by gel permeation chromatography, calibrated with polystyrene standard. The molecular weight has units of grams/mole.

The radiation-curable ink desirably contains 20 parts by mass or greater, 25 parts by mass or greater, or 30 parts by mass or greater of the bifunctional urethane (meth)acrylate oligomer relative to 100 parts by mass of the radiation-curable component. By setting the content of the bifunctional urethane (meth)acrylate oligomer to 20 parts by mass or greater relative to 100 parts by mass of the radiation-curable component, flexibility, low temperature impact resistance, and chemical resistance of a cured product of the radiation-curable ink can be further enhanced. The radiation-curable ink desirably contains 50 parts by mass or less, 45 parts by mass or less, or 40 parts by mass or less of the bifunctional urethane (meth)acrylate oligomer relative to 100 parts by mass of the radiation-curable component. By setting the content of the bifunctional urethane (meth)acrylate oligomer to 50 parts by mass or less relative to 100 parts by mass of the radiation-curable component, excellent inkjet dischargeability or coatability can be achieved. Herein, in the present disclosure, "radiation-curable component" includes bifunctional urethane (meth)acrylate oligomers, other radiation-curable polymerizable monomers and radiation-curable polymerizable oligomers such as a monofunctional monomer having a dioxane moiety or a dioxolane moiety described below, and the compound represented by Formula (1) described below.

In some embodiments, the radiation-curable ink can contain another radiation-curable polymerizable oligomer or monomer and, for example, can contain a monofunctional monomer having a dioxane moiety or a dioxolane moiety. Such other radiation-curable polymerizable oligomer and monomer can be used alone or in combination of two or more.

The monofunctional monomer having a dioxane moiety or a dioxolane moiety has at least one of a dioxane moiety and a dioxolane moiety in the molecule and is a compound having only one reactive functional group. In the case where a combination of the monofunctional monomer having a dioxane moiety or a dioxolane moiety and a bifunctional urethane (meth)acrylate oligomer is used, low temperature impact resistance of a cured product and a surface layer containing the cured product can be enhanced. Examples of the reactive functional group include a (meth)acryloyl group, a (meth)acrylamide group, and a vinyl group. Due to high reactivity with the bifunctional urethane (meth)acrylate oligomer, it is advantageous for the monofunctional monomer having a dioxane moiety or a dioxolane moiety to have a (meth)acryloyl group, especially an acryloyl group. One type of or a combination of two or more types of the monofunctional monomers each having a dioxane moiety or a dioxolane moiety may be used.

Examples of the monofunctional monomer having a dioxane moiety or a dioxolane moiety include monofunctional monomers having a dioxane moiety, such as (5-ethyl-1,3-dioxan-5-yl)methyl (meth)acrylate (also referred to as "cyclic trimethylolpropane formal acrylate"), (2-methyl-5-ethyl-1,3-dioxan-5-yl)methyl (meth)acrylate, (2,2-dimethyl-5-ethyl-1,3-dioxan-5-yl)methyl (meth)acrylate, (2-methyl-2,5-diethyl-1,3-dioxan-5-yl)methyl (meth)acrylate, (2,2,5-triethyl-1,3-dioxan-5-yl)methyl (meth)acrylate, (2,5-diethyl-1,3-dioxan-5-yl)methyl (meth)acrylate, and polyethylene glycol (meth)acrylate having a 1,3-dioxane ring; and monofunctional monomers having a dioxolane moiety, such as (2-methyl-2-ethyl-1,3-dioxolan-4-yl)methyl (meth)acrylate, (2-cyclohexyl-1,3-dioxolan-4-yl)methyl (meth)acrylate, (2,2-dimethyl-1,3-dioxolan-4-yl)methyl (meth)acrylate, (2-methyl-2-isobutyl-1,3-dioxolan-4-yl) methyl (meth)acrylate, (2-methyl-2-acetonyl-1,3-dioxolan-4-yl)methyl (meth)acrylate, (2-oxo-1,3-dioxolan-4-yl) methyl (meth)acrylate, 2-(2-oxo-1,3-dioxolan-4-yl)ethyl (meth)acrylate, and 3-(2-oxo-1,3-dioxolan-4-yl)propyl (meth)acrylate.

The monofunctional monomer having a dioxane moiety or a dioxolane moiety is desirably (5-ethyl-1,3-dioxan-5-yl) methyl (meth)acrylate or (2-methyl-2-ethyl-1,3-dioxolan-4-yl)methyl (meth)acrylate; from the perspective of high reactivity with a bifunctional urethane (meth)acrylate oligomer, is more desirably (5-ethyl-1,3-dioxan-5-yl)methyl acrylate or (2-methyl-2-ethyl-1,3-dioxolan-4-yl)methyl acrylate; from the perspective of imparting excellent low temperature impact resistance to a cured product, is particularly desirably (2-methyl-2-ethyl-1,3-dioxolan-4-yl)methyl acrylate.

The radiation-curable ink desirably contains 10 parts by mass or greater, 20 parts by mass or greater, or 30 parts by mass or greater and desirably contains 80 parts by mass or less, 70 parts by mass or less, or 50 parts by mass or less, of the monofunctional monomer having a dioxane moiety or a dioxolane moiety relative to 100 parts by mass of the radiation-curable component. By setting the content of the monofunctional monomer having a dioxane moiety or a dioxolane moiety to 10 parts by mass or greater relative to 100 parts by mass of the radiation-curable component, excellent low temperature impact resistance can be achieved. By setting the content of the monofunctional monomer having a dioxane moiety or a dioxolane moiety to 80 parts by mass or less relative to 100 parts by mass of the radiation-curable component, excellent weather resistance can be achieved.

In some embodiments, the radiation-curable ink may contain another radiation-curable polymerizable monomer. Examples of another radiation-curable polymerizable monomer include chain-like alkyl (meth)acrylates, such as methyl (meth)acrylate, ethyl (meth)acrylate, n-butyl (meth)acrylate, isoamyl (meth)acrylate, 2-methylbutyl (meth)acrylate, n-hexyl (meth)acrylate, 2-ethylhexyl (meth)acrylate, n-octyl (meth)acrylate, isooctyl (meth)acrylate, isononyl (meth) acrylate, decyl (meth)acrylate, and dodecyl (meth)acrylate; alicyclic (meth)acrylates, such as cyclohexyl (meth)acrylate, trimethylcyclohexyl (meth)acrylate, and isobornyl (meth)

acrylate; phenoxyalkyl (meth)acrylates, such as phenoxyethyl (meth)acrylate; alkoxy alkyl (meth)acrylates, such as methoxypropyl (meth)acrylate, 2-methoxybutyl (meth)acrylate, and 2-(2-ethoxyethoxy)ethyl (meth)acrylate; cyclic ether-containing (meth)acrylates, such as glycidyl (meth) acrylate and tetrahydrofurfuryl (meth)acrylate; hydroxy group-containing (meth)acrylates, such as 2-hydroxyethyl (meth)acrylate, 2-hydroxypropyl (meth)acrylate, and 4-hydroxybutyl (meth)acrylate; nitrogen-containing (meth)acryloyl compounds, such as (meth)acrylamide and N,N-diethyl (meth)acrylamide; and monofunctional monomers, such as (meth)acrylic acid. Examples of another radiation-curable polymerizable monomer include monofunctional monomers including vinyl compounds, such as vinyl acetate, vinyl propionate, styrene, and vinyl toluene; unsaturated nitriles, such as acrylonitrile and methacrylonitrile; unsaturated carboxylic acids, such as crotonic acid, itaconic acid, fumaric acid, citraconic acid, and maleic acid. Among these, from the perspectives of exhibiting a low gloss appearance after irradiation, achieving low viscosity of the ink, and storage stability, n-octyl (meth)acrylate and trimethylcyclohexyl (meth)acrylate are preferred, and a combined use of these is more preferred.

Another radiation-curable polymerizable monomer may be a polyfunctional monomer. A polyfunctional monomer can enhance strength and durability of a cured product by functioning as a crosslinking agent. Crosslinking by using a polyfunctional monomer may enhance adhesion between a surface layer containing a cured product and another layer on a substrate or a surface layer. From the perspectives of elongation properties and impact resistance, the content of the polyfunctional monomer is 5 parts by mass or less, or preferably 3 parts by mass or less, relative to 100 parts by mass of the radiation-curable component.

Examples of the polyfunctional monomer include bifunctional (meth)acrylates, such as 1,4-butane diol di(meth)acrylate, 1,6-hexane diol di(meth)acrylate, ethylene glycol di(meth)acrylate, cyclohexane dimethanol di(meth)acrylate, diethylene glycol di(meth)acrylate, dipropylene glycol di(meth)acrylate, and polyethylene glycol di(meth)acrylate; trifunctional (meth)acrylates, such as glycerol tri(meth)acrylate, trimethylolpropane tri(meth)acrylate, and pentaerythritol tri(meth)acrylate; (meth)acrylates having 4 or more functional groups, such as ditrimethylolpropane tetra(meth)acrylate, dipentaerythritol penta(meth)acrylate, and pentaerythritol tetra(meth)acrylate.

For example, because reactivity with a bifunctional urethane (meth)acrylate oligomer and any monofunctional monomer having a dioxane moiety or a dioxolane moiety is high and a cured product having excellent adhesion to another material, such as a substrate layer and a decorative layer, is formed, it is advantageous for such another radiation-curable polymerizable monomer to have a (meth)acryloyl group, especially an acryloyl group.

In some embodiments, the radiation-curable ink contains no such other radiation-curable polymerizable monomer containing a monofunctional monomer and a polyfunctional monomer described above or can contain greater than 0 parts by mass, 10 parts by mass or greater, or 20 parts by mass or greater, and 70 parts by mass or less, 60 parts by mass or less, or 50 parts by mass or less, of the radiation-curable polymerizable monomer relative to 100 parts of the radiation-curable component.

As another radiation-curable polymerizable oligomer, besides the bifunctional urethane (meth)acrylate oligomer, for example, polyester (meth)acrylate and epoxy (meth) acrylate can be used. These radiation-curable polymerizable oligomers may be monofunctional or polyfunctional.

In some embodiments, the radiation-curable ink contains no such other radiation-curable polymerizable oligomer or can contain greater than 0 parts by mass, 5 parts by mass or greater, or 10 parts by mass or greater, and 50 parts by mass or less, 40 parts by mass or less, or 30 parts by mass or less, of the radiation-curable polymerizable oligomer relative to 100 parts of the radiation-curable component.

In some embodiments, the total content of other radiation-curable polyfunctional monomer and the radiation-curable polyfunctional oligomer in the radiation-curable ink can be 30 parts by mass or less, 20 parts by mass or less, 10 parts by mass or less, 5 parts by mass or less, 3 parts by mass or less, or 1 part by mass or less, relative to 100 parts by mass of the radiation-curable component, or none of these polyfunctional monomer and the polyfunctional oligomer may be contained in the ink. By using no polyfunctional monomer and polyfunctional oligomer or by setting the total content described above to 10 parts by mass or less, transfer of aggregates of the inorganic nanoparticles to the surface can be enhanced, and flexibility or elongation property of a cured product can be enhanced.

As a photopolymerization initiator, for example, a known compound that causes a radical polymerization reaction can be used. As the photopolymerization initiator, any of intramolecular cleavage type and hydrogen transfer type can be used. Examples of the photopolymerization initiator include 1-hydroxycyclohexyl phenyl ketone, 2,2-dimethoxy-2-phenylacetophenone, 2-methyl-1-[4-(methylthio)phenyl]-2-morpholinopropan-1-one, 2-hydroxy-2-methyl-1-phenyl-propan-1-one, 2-benzyl-2-dimethylamino-1-(4-morpholinophenyl)-butan-1-one, 1-[4-(2-hydroxyethoxy)-phenyl]-2-hydroxy-2-methyl-1-propan-1-one, 2,4,6-trimethylbenzoyldiphenylphosphine oxide, 2,6-dimethylbenzoyl-diphenylphosphine oxide, benzoyldiethoxyphosphine oxide, bis(2,6-dimethoxybenzoyl)-2,4,4-trimethylpentylphosphine oxide, benzoin alkyl ether (e.g. benzoin methyl ether, benzoin ethyl ether, benzoin isopropyl ether, benzoin isobutyl ether, and n-butyl benzoin ether), methylbenzoyl formate, 1-(4-isopropylphenyl)-2-hydroxy-2-methylpropan-1-one, 2-hydroxy-2-methyl-1-phenylpropan-1-one, p-tert-butyl-trichloroacetophenone, p-tert-butyldichloroacetophenone, benzyl, acetophenone, thioxanthone compounds, (2-chloro-thioxanthone, 2-methylthioxanthone, 2,4-diethylthioxanthone, 2,4-diisopropylthioxanthone), camphorquinone, 3-ketocoumarin, anthraquinone compounds (e.g. anthraquinone, 2-ethylanthoraquinone, α-chloroanthraquinone, and 2-tert-butylanthraquinone), acenaphthene, 4,4'-dimethoxybenzyl, and 4,4'-dichlorobenzyl. The photopolymerization initiator can be used alone or in combination of two or more.

In some embodiments, the radiation-curable ink can contain 1 part by mass or greater, or 2 parts by mass or greater, and 20 parts by mass or less, or 15 parts by mass or less, of the photopolymerization initiator relative to 100 parts by mass of the radiation-curable component.

In some embodiments, the radiation-curable ink of the present disclosure can contain the compound represented by Formula (1) below.

For example, an inkjet printing method typically applies an inkjet ink to a substrate by discharging the ink from a discharging nozzle, and examples of required performances of the ink include being an ink having low viscosity, having a little foreign substance content and thus being less likely to cause clogging. In the case where inorganic nanoparticles are simply contained in an ink, typically, the viscosity tends to be high, that is, opposite of the required performances, and conditions occur, for example, in which a discharging nozzle tends to be clogged as the nanoparticles aggregate. In such circumstances, the present inventors found that, by using the inorganic nanoparticles and the compound represented by Formula (1) described below in combination, aggregation and unification of the inorganic nanoparticles in the ink can be reduced or suppressed, and the viscosity of the ink can be set to such a degree of low viscosity that enables printing or coating by, for example, an inkjet printing method, a gravure coating method, or a bar coating method.

The compound represented by Formula (1) can be represented by the following chemical formula

$$R^1\text{-}R^2\text{—}Si(OR^3)_3 \qquad \text{Formula (1)}$$

wherein, $R^1$ is an acryloyl group or a methacryloyl group, $R^2$ is an alkylene group having from 5 to 12 carbon atoms, and $R^3$ is an alkyl group having from 1 to 4 carbon atoms. From the perspective of achieving low viscosity, $R^1$ is preferably a methacryloyl group, $R^2$ is preferably an alkylene group having from 6 to 10 carbon atoms, and more preferably an alkylene group having from 8 to 10 carbon atoms, and $R^3$ is preferably an alkyl group having from 1 to 3 carbon atoms, and more preferably an alkyl group having from 1 to 2 carbon atoms. Among these, as the compound represented by Formula (1), 8-(meth)acryloxyoctyltrimethoxysilane is particularly preferred. The compound represented by Formula (1) can be used alone or in combination of two or more.

Although the reason why the compound represented by Formula (1) is capable of reducing the viscosity of the ink is not known, it is conceived that this is affected by the fact that the chain length of $R^2$ is longer than that of a typical silane coupling agent. That is, by the $R^2$ moiety having a long chain length in the compound represented by Formula (1) bonded to the inorganic nanoparticles, it is conceived that fluidity of the particle is enhanced because it becomes difficult for the particles to come close to each other, and thus the viscosity of the ink can be reduced.

The compounded amount of the compound represented by Formula (1) is not particularly limited. The compound is one type of silane coupling agents; however, unlike a typical silane coupling agent, the compound is not used for, for example, enhancement of adhesion to a substrate and is used to achieve low viscosity. Therefore, the used amount of the compound can be a smaller amount than a used amount of a typical silane coupling agent. For example, from the perspective of achieving low viscosity, the compounded amount of the compound represented by Formula (1) can be 0.030 mmol or greater, 0.040 mmol or greater, or 0.050 mmol or greater, and 0.090 mmol or less, 0.080 mmol or less, 0.070 mmol or less, per 1 g of the inorganic nanoparticles.

In some embodiments, the radiation-curable ink of the present disclosure can further contain a non-functional silane coupling agent. The non-functional silane coupling agent can contribute to achievement of low viscosity of the ink.

Because the compound represented by Formula (1) contains an acryloyl group or a methacryloyl group as $R^1$, for example, a crosslinking structure can be formed with the radiation-curable polymerizable oligomer and/or the radiation-curable polymerizable monomer in the ink by radiation, and although hardness or wear resistance of the surface layer can be thus enhanced, for example, elongation properties required in decorative films may be reduced. In the case where formation of the crosslinking structure is desirably reduced and elongation properties are desirably imparted while achievement of low viscosity of the ink is attempted, it is advantageous to use the compound represented by Formula (1) and the non-functional silane coupling agent in combination.

Such a non-functional silane coupling agent is not particularly limited, and examples thereof include n-propyltrimethoxysilane, isopropyltrimethoxysilane, n-butyltrimethoxysilane, isobutyltrimethoxysilane, n-pentyltrimethoxysilane, isopentyltrimethoxysilane, n-hexyltrimethoxysilane, isohexyltrimethoxysilane, n-heptyltrimethoxysilane, isoheptyltrimethoxysilane, n-octyltrimethoxysilane, and isooctyltrimethoxysilane. Among these, n-propyltrimethoxysilane, n-hexyltrimethoxysilane, and isooctyltrimethoxysilane are preferred, and isooctyltrimethoxysilane is more preferred. These may be used alone or in combination of two or more of them.

The compounded amount of the non-functional silane coupling agent is not particularly limited, but similarly to the compound represented by Formula (1), from the perspective of achieving low viscosity, the compounded amount can be 0.030 mmol or greater, 0.040 mmol or greater, or 0.050 mmol or greater, and 0.090 mmol or less, 0.080 mmol or less, 0.070 mmol or less, per 1 g of the inorganic nanoparticles.

In the case where the viscosity of the ink is reduced, typically, dilution is often performed by blending an organic or water-based solvent; however, for example, use of an organic solvent deteriorates work environment, and all solvents require drying after printing or coating and tend to deteriorate, for example, productivity. In the case where the ink containing a large amount of a solvent is, for example, used for printing on a resin substrate by an inkjet printing method, the attached ink tends to wet-spread on the substrate surface, and thus the target printing performance may not be adequately exhibited. Meanwhile, in the case of an ink having a little solvent or no solvent, the attached ink is less likely to wet-spread on a resin surface, thus excellent printing performance can be exhibited and, for example, three-dimensional protrusions and recesses corresponding to texture with a genuine feel or a design of, for example, a decorative film, can be imparted to a substrate surface. Since the radiation-curable ink of the present disclosure can achieve low viscosity by using the particular compound represented by Formula (1) and an optional non-functional silane coupling agent described above, the content of the solvent can be 5 mass % or less, 3 mass % or less, or 1 mass % or less, relative to the total amount of the ink, or no solvent may be contained.

For example, in the case of a known ink containing a high degree of solvent and containing microbeads, when a surface layer is formed by applying the ink on a substrate surface and then the solvent in this surface layer is dried, the volume of the surface layer decreases, and some of the microbeads are deposited on the surface layer surface. Thus, a low gloss appearance tends to be exhibited. However, in the case where the content of the solvent in the ink is 5 mass % or less, such a volume reduction effect of the surface layer is not exhibited, and some of microbeads are less likely to be deposited on the surface layer surface. Thus, it has been difficult to exhibit a low gloss appearance. In this case, for example, employment of beads having a size greater than the thickness of a surface layer is also possible; however, an ink containing beads having such a size has higher possibility of clogging an inkjet nozzle or the like. On the other hand, the radiation-curable ink of the present disclosure can exhibit a low gloss appearance by irradiating a surface layer applied to a substrate with radiation even when the content of the solvent in the ink is 5 mass % or less.

The radiation-curable ink may contain additives, such as photostabilizers, polymerization inhibitors, UV absorbing agents, antifoaming agents, antifouling agents, surface conditioners, pigments, and dyes, as optional components.

The radiation-curable ink of the present disclosure can exhibit a low gloss appearance without use of beads that are used in known inks, such as resin beads or glass beads in micrometer order; however, use of such beads is not prohibited. In the case such beads are used, the used amount thereof can be, for example, 10 mass % or less, 7 mass % or less, 5 mass % or less, 3 mass % or less, or 1 mass % or less, relative to the total weight (solid content) of the ink or relative to the total weight (dry coating amount) of the surface layer.

The surface layer prepared by using the radiation-curable ink of the present disclosure and by irradiation can exhibit excellent low gloss appearance.

The low gloss appearance of the surface layer can be evaluated by, for example, 60° surface glossiness obtained by setting a measurement angle to 60°. The 60° surface glossiness can be 50.0 GU or less, 40.0 GU or less, 30.0 GU or less, 20.0 GU or less, or 15.0 GU or less. The lower limit of the 60° surface glossiness is not particularly limited and, for example, can be 1.0 GU or greater, 3.0 GU or greater, or 5.0 GU or greater. The surface glossiness of the present disclosure is measured by using Portable Gloss Meter BYK-Gardner Micro-tri-gloss (BYK-Chemie Japan K.K.) in accordance with JIS Z 8741. This surface glossiness is a numerical value obtained by measuring a surface layer in a state in which a mechanical means, such as embossment, has not been applied.

In some embodiments, the surface glossiness of the surface layer of the laminate can be evaluated by 20° surface glossiness obtained by setting a measurement angle to 20°. The 20° surface glossiness can be 20.0 GU or less, 15.0 GU or less, or 10.0 GU or less. The lower limit of the 20° surface glossiness is not particularly limited and, for example, can be 0.1 GU or greater, 0.3 GU or greater, or 0.5 GU or greater.

In some embodiments, the surface glossiness of the surface layer of the laminate can be evaluated by 80° surface glossiness obtained by setting a measurement angle to 80°. The 80° surface glossiness can be 90.0 GU or less, 85.0 GU or less, or 80.0 GU or less. The lower limit of the 80° surface glossiness is not particularly limited and, for example, can be 10.0 GU or greater, 13.0 GU or greater, or 15.0 GU or greater.

In some embodiments, the initial viscosity of the radiation-curable ink can be, for example, 35.0 mPa·s or less, 30.0 mPa·s or less, 25.0 mPa·s or less, 20.0 mPa·s or less, 18.0 mPa·s or less, 17.0 mPa·s or less, 16.0 mPa·s or less, 15.0 mPa·s or less, 14.0 mPa·s or less, 13.0 mPa·s or less, or 12.0 mPa·s or less, at 55° C. from the perspectives of dischargeability from an inkjet nozzle and coatability. The lower limit of the initial viscosity is not particularly limited but can be, for example, 1.0 mPa·s or greater, 3.0 mPa·s or greater, or 5.0 mPa·s or greater, from the perspective of printing suitability. The radiation-curable ink having the viscosity range described above can be prepared by, for example, using the compound represented by Formula (1) and/or the non-functional silane coupling agent described above.

In some embodiments, the radiation-curable ink of the present disclosure has excellent storage stability at high temperatures. The storage stability can be indirectly evaluated by the viscosity at 55° C. after 1 week of storage of the ink at 60° C. The radiation-curable ink of an embodiment of the present disclosure can achieve the viscosity at 55° C. after 1 week of storage of the ink at 60° C. of 30.0 mPa·s or less, 25.0 mPa·s or less, 20.0 mPa·s or less, 18.0 mPa·s or less, 17.0 mPa·s or less, 16.0 mPa·s or less, 15.0 mPa·s or less, 14.0 mPa·s or less, 13.0 mPa·s or less, or 12.0 mPa·s or less. The lower limit of the viscosity is not particularly limited but can be, for example, 1.0 mPa·s or greater, 3.0 mPa·s or greater, or 5.0 mPa·s or greater.

The surface layer can be formed by applying the radiation-curable ink directly on a substrate or applying the radiation-curable ink on a substrate with another layer interposed between the radiation-curable ink and the substrate by various printing methods or coating methods, and then curing by irradiation with UV radiation, electron beam, or other radiation. In the case where irradiation is performed, typically, to prevent lowering of curing rate or curing failure due to oxygen, the irradiation is often performed in a nitrogen atmosphere. However, as described above, when the curing rate of the radiation-curable oligomer or the like around surface of the surface layer is different from the curing rate in the inner part, it is conceived that the aggregates of the inorganic nanoparticles are easily transferred into close proximity to the surface, thus the irradiation is advantageously performed in air atmosphere containing oxygen. For example, with the inkjet printing method, purging with nitrogen is difficult due to the structure of the device and, typically, the ink is radiation cured in an air atmosphere. Thus, the radiation-curable ink of the present disclosure can be suitably used for the inkjet printing method.

In general, while an ink having high viscosity easily reduces or suppresses aggregation or unification of inorganic particles in the ink, an ink having low viscosity has difficulty reducing or suppressing aggregation or unification of inorganic particles. The radiation-curable ink of the present disclosure can reduce or suppress aggregation and unification of inorganic nanoparticles in the ink while having low viscosity, the radiation-curable ink can be used for various printing methods or coating methods that require use of a low viscosity ink, such as an inkjet printing method, a gravure coating method, a bar coating method, a knife coating method, a capillary coating method, a spray coating method, and a three-dimensional printing method by optical shaping (also referred to as "additive manufacturing method"). Among these, the radiation-curable ink of the present disclosure can be suitably used for an inkjet printing method, which can be easily affected by aggregated substances. The surface layer prepared by such a method can be, for example, differentiated from an inkjet printing surface layer or a gravure coating surface layer.

The radiation-curable ink can be printed or coated on at least a part of a substrate or may be printed or coated on the entire substrate. The surface layer before irradiation may have a substantially smooth surface or may have a protruded-recessed form, such as an embossed pattern, on the surface. When such a surface layer is irradiated with radiation, fine protrusions and recesses in nanometer order originated from the inorganic nanoparticles and protrusions and recesses in micrometer order, that are different from protrusion-recess shapes of embossed patterns or the like, can be formed on the surface of the surface layer.

The thickness of the surface layer is not particularly limited and can be appropriately adjusted depending on, for example, exhibition of a low gloss appearance after the irradiation and design. For example, the thickness of the surface layer may be, at least partially, 7 μm or greater, 20 μm or greater, or 30 μm or greater. By allowing the surface layer to have a part having a thickness of 7 μm or greater, for example, in the case where a laminate is used as a decorative film, three-dimensional protrusions and recesses corresponding to texture with a genuine feel or a design of the decorative film can be imparted to a surface of the decorative film.

In some embodiments, the maximum thickness of the surface layer can be, for example, 500 µm or less, 300 µm or less, or 100 µm or less. By setting the maximum thickness of the surface layer to 500 µm or less, suitable flexibility, such as elongation properties and bending properties, of the surface layer can be achieved.

The thickness of the surface layer can be appropriately adjusted by, for example, repeatedly printing or coating the radiation-curable ink for multiple times locally or in its entirety. Note that the thickness of each layer in the laminate of the present disclosure can be defined as an average value of thicknesses of selected at least 5 points in a target layer, such as a surface layer, of the laminate structure obtained by measuring a thickness direction cross section of the laminate structure using a scanning electron microscope (SEM).

The surface layer may be transparent, translucent, or opaque in visible range in its entirety or partially to provide a target appearance.

The substrate constituting the laminate of the present disclosure can be used as, for example, a support of the surface layer. The surface of the substrate may be subjected to surface treatment, such as corona treatment or plasma treatment.

The material of the substrate is not particularly limited, and examples thereof include various resin materials, such as polyvinyl chloride resins, polyurethane resins, polyolefin resins such as polyethylene (PE) and polypropylene (PP), polyester resins such as polyethylene terephthalate (PET) and polyethylene naphthalate (PEN), polycarbonate resins, polyimide resins, polyamide resins, (meth)acrylic resins such as polymethyl methacrylate (PMMA), and fluororesins, as well as copolymers, such as ethylene-vinylacetate copolymers (EVA), ethylene-acrylic acid copolymers, ethylene-ethyl acrylate copolymers, ethylene-vinylacetate copolymers, acrylonitrile-butadiene rubber (NBR), and acrylonitrile-butadiene-styrene copolymers (ABS). These may be used alone or in combination of two or more of them. As the substrate, an inorganic substrate such as glass or a metal substrate such as aluminum can be used.

The shape or configuration of the substrate is not particularly limited and may be, for example, a film shape, a plate shape, a curved surface shape, an odd shape, or a three-dimensional shape, or may be a single-layer configuration, a laminate configuration, or a composite configuration, such as those formed of a combination of a plurality of substrates having different shapes.

The substrate may be colored or colorless. The substrate may be opaque, translucent, or transparent. The substrate may have a substantially smooth surface, or may have a structured surface that can be formed by surface processing such as embossing.

The thickness of the substrate can be, for example, 50 µm or greater, 80 µm or greater, or 100 µm or greater. The upper limit of the thickness is not particularly limited but can be, for example, 500 µm or less, 300 µm or less, or 200 µm or less, from the perspectives of followability and production cost, for example.

In some embodiments, the laminate of the present disclosure can further have, for example, at least one selected from the group consisting of a decorative layer, a brightening layer, a bonding layer, an adhesive layer, and a release liner, depending on the use thereof. In the present disclosure, for example, a laminate having a colored substrate and/or surface layer or a laminate having a decorative layer and/or a brightening layer may be referred to as a decorative film.

In the laminate of the present disclosure, a decorative layer can be, for example, arranged on or below a substrate. The decorative layer can be, for example, applied to an entire surface or a portion of the substrate.

Examples of the decorative layer include, but are not limited to: a color layer that exhibits a paint color, for example a light color such as white and yellow, or a dark color such as red, brown, green, blue, gray, and black; a pattern layer that imparts to an article a pattern, a logo, a design or the like such as a wood grain tone, a stone grain tone, a geometric pattern, and a leather pattern; a relief (embossed carving pattern) layer provided with an protruded and recessed shape on a surface; and combinations thereof.

As a material of the color layer, for example, a material in which a pigment such as an inorganic pigment such as carbon black, yellow lead, yellow iron oxide, Bengala, or red iron oxide; a phthalocyanine pigment such as phthalocyanine blue or phthalocyanine green; and an organic pigment such as an azo lake pigment, an indigo pigment, a perinone pigment, a perylene pigment, a quinophthalone pigment, a dioxazine pigment, and a quinacridone pigment such as quinacridone red is dispersed in a binder resin such as a (meth)acrylic resin or a polyurethane resin can be used. However, the material of the color layer is not limited thereto.

Such a material may be used to form the color layer by, for example, a coating method such as gravure coating, roll coating, die coating, bar coating, and knife coating, or a printing method such as inkjet printing.

As a pattern layer, a pattern layer obtained by, for example, directly applying a pattern, a logo, a design, or other such patterns to the substrate or the like by using a printing method such as gravure direct printing, gravure offset printing, inkjet printing, laser printing, or screen printing may be adopted, or a film, a sheet, or the like having a pattern, a logo, a design, or the like formed by coating such as gravure coating, roll coating, die coating, bar coating, and knife coating, or by punching, etching, or the like may also be used. However, the pattern layer is not limited thereto. For example, a material similar to the material used in the color layer may be used as the material of the pattern layer.

As a relief layer, a thermoplastic resin film having a concavo-convex shape on a surface obtained by a conventionally known method such as embossing, scratching, laser machining, dry etching, or hot pressing may be used. The relief layer can also be formed by coating a release liner having a concavo-convex shape with a thermosetting or radiation curable resin such as a curable (meth)acrylic resin, curing by heating or radiation irradiation, and removing the release liner.

The thermoplastic resin, the thermosetting resin, and the radiation curable resin used in the relief layer are not particularly limited and, for example, a fluororesin, PET, PEN, and other such polyester resins, a (meth)acrylic resin, polyethylene, polypropylene, and other such polyolefin resins, a thermoplastic elastomer, a polycarbonate resin, a polyamide resin, an ABS resin, an acrylonitrile-styrene resin, a polystyrene resin, a vinyl chloride resin, and a polyurethane resin may be used. The relief layer may include at least one of the pigments used in the color layer.

The thickness of the decorative layer can be appropriately adjusted depending on, for example, required decorative properties and concealing properties and is not limited to a particular thickness, and may be, for example, 1 µm or greater, 3 µm or greater, or 5 µm or greater, and may be 50 µm or less, 40 µm or less, 30 µm or less, 20 µm or less, or 15 µm or less.

The brightening layer is not limited to the following, but may be a layer that includes a metal selected from aluminum, nickel, gold, silver, copper, platinum, chromium, iron, tin, indium, titanium, lead, zinc, and germanium, or an alloy or a compound thereof, and that is formed by vacuum deposition, sputtering, ion plating, plating, or the like on an entire surface or a part of the substrate or the decorative layer. The thickness of the brightening layer may be selected arbitrarily according to the required decorative property, brightness and the like.

A bonding layer (may be referred to as a "primer layer" or the like) may be used to bond the layers constituting the laminate. As a bonding layer, for example, a commonly used (meth)acrylic-based, polyolefin-based, polyurethane-based, polyester-based, or rubber-based solvent type, emulsion type, pressure sensitive type, heat sensitive type, thermosetting type, or UV curing type adhesive may be used. The bonding layer may be applied by a known coating method or the like.

The thickness of the bonding layer may be, for example, 0.05 µm (micrometers) or greater, 0.5 µm or greater, or 5 µm or greater, and may be 100 µm or less, 50 µm or less, 20 µm or less, or 10 µm or less.

The laminate may further have an adhesive layer to adhere the laminate to an adherend. As a material of the adhesive layer, materials that are the same as that of the bonding layer may be used. The adhesive layer may be applied to an adherend instead of the laminate.

The thickness of the adhesive layer may be, but not limited to, for example, 5 µm or greater, 10 µm or greater, or 20 µm or greater, and may be 200 µm or less, 100 µm or less, or 80 µm or less.

The substrate, the decorative layer, the bonding layer, and the adhesive layer according to the present disclosure may include, as an optional component, for example, a filler, a reinforcing material, an antioxidant, a UV absorber, a light stabilizer, a thermal stabilizer, a tackifier, a dispersant, a plasticizer, a flow improving agent, a surfactant, a leveling agent, a silane coupling agent, a catalyst, a pigment, and a dye, within the range that does not inhibit the effects of the present disclosure and decorative properties.

Any suitable release liner may be used to protect the adhesive layer. Examples of a typical release liner include those prepared from paper (e.g., kraft paper), and from polymeric materials (e.g., polyolefin such as polyethylene or polypropylene, ethylene vinyl acetate, polyurethane, polyethylene terephthalate, and other such polyester). On the release liner, a layer of a release agent such as a silicone-containing material or a fluorocarbon-containing material may be applied as necessary.

The thickness of the release liner may be, for example, 5 µm or greater, 15 µm or greater, or 25 µm or greater, and may be 300 µm or less, 200 µm or less, or 150 µm or less. The thickness of the release liner can be defined as an average value calculated by, after the release liner is removed from the adhesive layer, measuring the thickness of selected portion of the release liner for at least five times by using High-Accuracy Digimatic Micrometer (MDH-25 MB, available from Mitutoyo Corporation).

The laminate of the present disclosure can be appropriately prepared by a single or a combination of a plurality of publicly known methods, such as printing methods including inkjet printing methods, gravure direct printing, gravure offset printing, and screen printing, coating methods such as gravure coating, roll coating, die coating, bar coating, knife coating, and extrusion coating methods, lamination methods, and transfer methods.

The product form of the laminate of the present disclosure is not particularly limited and examples thereof include cut-sheet products such as sheets, laminate products in which a plurality of sheets are piled up, and roll products in which a sheet is wound in a roll form.

In some embodiments, the surface layer of the present disclosure can be stretched, and a laminate having this surface layer can exhibit excellent elongation properties. The elongation properties can be evaluated by, for example, a test for elongation at break. The surface layer of the laminate in some embodiments can exhibit 50% or greater, 70% or greater, 80% or greater, 85% or greater, or 90% or greater, of the elongation at break at 20° C. The upper limit of the elongation at break is not particularly limited and, for example, can be 200% or less, 180% or less, 160% or less, or 150% or less. "Break" refers to case where appearance change that is visually recognizable by eyes, such as crack or gloss change, on a surface of the surface layer occurs. The laminate having such elongation properties can be suitably used as, for example, a decorative film.

In the test for elongation at break, a test sample is prepared by cutting a laminate into a length of 100 mm and a width of 25 mm, and elongation at the time when the surface layer of the test sample is broken is measured at a nipping distance of 50 mm, a tensile speed of 300 mm/min, and 20° C. by using a tensile tester (TENSILON Universal Testing Machine, model: RTC-1210A, available from A&D Company, Limited). From the expression: (length at break of test sample−length before elongation of test sample)/(length before elongation of test sample)×100(%), the elongation at break is determined.

The application of the laminate of the present disclosure is not particularly limited. For example, the laminate of the present disclosure can be used for the decorative applications, the optical applications, or the like. For example, the laminate of the present disclosure can be used as an interior material for interior walls, stairs, windows, doors, floors, ceilings, columns, or partitions of building structures such as buildings, apartments, or houses, or an exterior material for outer walls, and can be used as various interior or exterior materials, such as interior or exterior materials for vehicles such as automobiles, trains, aircrafts, and ships. In addition, the laminate of the present disclosure can be used for electrical appliances such as PCs, smart phones, cellular phones, refrigerators, and air conditioners, stationery, furniture, tables, various containers such as cans, traffic signs, and signboards. Furthermore, for example, the laminate of the present disclosure can be also used as light diffusion components used in display devices such as liquid crystal displays and organic EL display devices, such as light diffusion films or light diffusion sheets to ensure uniformity of brightness of backlight or antiglare (AG) films to reduce or prevent reflection of light from fluorescent lamps.

EXAMPLES

Specific embodiments of the present disclosure will be exemplified in the following examples, but the present invention is not limited to these embodiments. All parts and percentages are based on mass unless otherwise specified.

Table 1 indicates materials, reagents and the like used in this example.

TABLE 1

| Trade name, model No., or abbreviation | Description | Source of supply |
|---|---|---|
| IPA-ST-ZL | $SiO_2$ particles dispersed in isopropanol; average particle size: 80 nm; solid content: 30.90 mass % | Nissan Chemical Industries, Ltd. (Chuo-ku, Tokyo, Japan) |
| IPA-ST-L | $SiO_2$ particles dispersed in isopropanol; average particle size: 45 nm; solid content: 31.14 mass % | Nissan Chemical Industries, Ltd. (Chuo-ku, Tokyo, Japan) |
| IPA-ST | $SiO_2$ particles dispersed in isopropanol; average particle size: 12 nm; solid content: 31.76 mass % | Nissan Chemical Industries, Ltd. (Chuo-ku, Tokyo, Japan) |
| KBM5803 | 8-Methacryloxyoctyltrimethoxysilane; solid content: 100 mass % | Shin-Etsu Chemical Co., Ltd. (Chiyoda-ku, Tokyo, Japan) |
| Isooctyltrimethoxysilane | Isooctyltrimethoxysilane; solid content: 100 mass % | Aldrich Chemical Company (USA) |
| 4-hydroxy-TEMPO free radical | 4-Hydroxy-2,2,6,6-tetramethylpiperidine 1-oxyl free radical; solid content: 100 mass % | Aldrich Chemical Company (USA) |
| CN991NS | Bifunctional urethane acrylate oligomer; solid content: 100 mass % | Sartomer (USA) |
| Viscoat (trade name) 196 | Trimethylcyclohexyl acrylate; solid content: 100 mass % | Osaka Organic Chemical Industry Ltd. (Chuo-ku, Osaka-shi, Japan) |
| NOAA | n-Octyl acrylate; solid content: 100 mass % | Osaka Organic Chemical Industry Ltd. (Chuo-ku, Osaka-shi, Japan) |
| MEDOL-10 | (2-Methyl-2-ethyl-1,3-dioxolan-4-yl)methyl acrylate | Osaka Organic Chemical Industry Ltd. (Chuo-ku, Osaka-shi, Japan) |
| TEGO (trade name) Rad 2250 | Silicone polyether acrylate | Evonik Industries (Germany) |
| TEGO (trade name) Flow 425 | Polypolyether-modified Polysiloxane | Evonik Industries (Germany) |
| BYK-UV3510 | Polypolyether-modified Polysiloxane | BYK-Chemie Japan K.K. (Shinjuku-ku, Tokyo, Japan) |
| BYK-UV3530 | Polypolyether-modified acrylic functional siloxane | BYK-Chemie Japan K.K. (Shinjuku-ku, Tokyo, Japan) |
| BYK-UV3535 | Modified polyether, silicone-free | BYK-Chemie Japan K.K. (Shinjuku-ku, Tokyo, Japan) |
| Omnirad (trade name) 184 | Photopolymerization initiator: phenyl(1-hydroxycyclohexyl)methanone | GM Resins B.V. (Netherlands) |
| Genorad (trade name) 22 | Polymerization inhibitor | Evonik Industries (Germany) |
| IPA | 2-Propanol | Fujifilm Wako Pure Chemical Corporation (Chuo-ku, Osaka, Japan) |
| COSMOSHINE (trade name) A4100 | Polyethylene terephthalate film having one primer-treated face and having 50 μm thickness. | Toyobo Co., Ltd. (Kita-ku, Osaka-shi, Japan) |
| BK64620 | Black-colored polyvinyl chloride film | Bando Chemical Industries, Ltd. (Chuo-ku, Kobe-shi, Japan) |

Preparation of Surface-Modified Silica Sol

Surface-modified silica sols were prepared by the following methods.

Sol 1

Into a glass bottle containing 30 g of IPA, 0.452 g of KBM5803, 0.832 g of isooctyltrimethoxysilane, and 0.0045 g of 4-hydroxy-TEMPO free radical were added. This mixture was added into a glass bottle containing 150 g of IPA-ST-ZL and agitated at room temperature for 10 minutes. This glass bottle was sealed and left in an oven at 60° C. for 16 hours. After this mixture was charged in a flask, 113.40 g of Viscoat (trade name) 196 was mixed. Then, until the solid content of the mixture became approximately 30 mass %, the IPA was removed from the obtained mixture by using a rotary evaporator while heated at 55° C. Then, to this mixture, Viscoat (trade name) 196 was added in a manner that the concentration of the silica nanoparticles became 28.94 mass %, and thus a sol 1 was prepared.

Sol 2

Into a glass bottle containing 30 g of IPA, 0.8927 g of KBM5803, 1.6423 g of isooctyltrimethoxysilane, and 0.0089 g of 4-hydroxy-TEMPO free radical were added. This mixture was added into a glass bottle containing 150 g of IPA-ST-L and agitated at room temperature for 10 minutes. This glass bottle was sealed and left in an oven at 60° C. for 16 hours. After this mixture was charged in a flask, 114.90 g of Viscoat (trade name) 196 was mixed. Then, until the solid content of the mixture became approximately 30 mass %, the IPA was removed from the obtained mixture by using a rotary evaporator while heated at 55° C. Then, to this mixture, Viscoat (trade name) 196 was added in a manner that the concentration of the silica nanoparticles became 29.21 mass %, and thus a sol 2 was prepared.

Sol 3

Into a glass bottle containing 30 g of IPA, 1.8817 g of KBM5803, 3.4618 g of isooctyltrimethoxysilane, and 0.0188 g of 4-hydroxy-TEMPO free radical were added. This mixture was added into a glass bottle containing 150 g of IPA-ST and agitated at room temperature for 10 minutes. This glass bottle was sealed and left in an oven at 60° C. for 16 hours. After this mixture was charged in a flask, 123.65 g of Viscoat (trade name) 196 was mixed. Then, until the solid content of the mixture became approximately 30 mass %, the IPA was removed from the obtained mixture by using a rotary evaporator while heated at 55° C. Then, to this mixture, Viscoat (trade name) 196 was added in a manner that the concentration of the silica nanoparticles became 28.80 mass %, and thus a sol 3 was prepared.

Preparation of Radiation-Curable Ink

Using the raw materials shown in Table 2, radiation-curable inks were prepared by the following methods. Note that all the compounded amounts in Table 2 are in part by mass.

UV Ink-C1

Into a glass bottle, 2.500 g of CN991NS, 6.500 g of Viscoat (trade name) 196, and 1.000 g of NOAA were mixed. Then, to this mixture, 1.000 g of Omnirad (trade name) 184 as a photopolymerization initiator and 0.010 g of TEGO (trade name) Rad 2250 as a polyether-modified polymer were added, and thus UV ink-C1 was prepared.

UV Ink-C2

Into a glass bottle, 2.073 g of the sol 1, 2.350 g of CN991NS, 4.656 g of Viscoat (trade name) 196, and 0.940 g of NOAA were mixed. To this mixture, 1.000 g of Omnirad (trade name) 184 was added as a photopolymerization initiator, and thus UV ink-C2 was prepared.

UV Ink-C3

Into a glass bottle, 2.500 g of CN991NS, 5.500 g of Viscoat (trade name) 196, and 2.000 g of MEDOL-10 were mixed. Then, to this mixture, 1.000 g of Omnirad (trade name) 184 as a photopolymerization initiator, 0.100 g of TEGO (trademark) Flow 425 as a polyether-modified polymer, and 0.100 g of Genorad (trade name) 22 were added, and thus UV ink-C3 was prepared.

UV Inks-E1 to E13

UV inks-E1 to E13 were prepared in the same manner as in the preparation method for UV ink-C2 except for changing the compositional proportions to those shown in Table 2.

tive Example 1 except for changing the radiation-curable ink UV-C1 to each ink described in Table 3-1 to Table 3-3.

Example 14

Using an inkjet printer (inkjet head: KM1024iLMHB, 720×720 dpi, available from Konica Minolta, Inc.), on BK646420 which was a substrate film, an inkjet printing layer having a thickness of approximately 10 μm was printed while the radiation-curable ink UV-E13 was heated at 55° C. The substrate film to which the inkjet printing layer was applied was passed through a UV irradiator (H-valve (DRS model) from Fusion UV System Inc.) twice in an air atmosphere, and the inkjet printing layer was cured. At this time, the inkjet printing layer was irradiated with UV light (UV-A) in conditions of an illuminance of 700 mW/cm$^2$ and an integrated light quantity of 900 mJ/cm$^2$. In this way, a

TABLE 2

| Composition | Radiation-curable ink | | | | | | | | | | | | | | | |
|---|---|---|---|---|---|---|---|---|---|---|---|---|---|---|---|---|
| | UV-C1 | UV-C2 | UV-E1 | UV-E2 | UV-E3 | UV-E4 | UV-E5 | UV-E6 | UV-E7 | UV-E8 | UV-E9 | UV-E10 | UV-E11 | UV-E12 | UV-E13 | UV-C3 |
| Sol 1 (solid content: 28.94 mass %) | — | 2.073 | 2.073 | — | — | 0.691 | 1.382 | 2.764 | 3.455 | 6.911 | 2.073 | 2.073 | 2.073 | 2.073 | 2.073 | — |
| Sol 2 (solid content: 29.21 mass %) | — | — | — | 2.054 | — | — | — | — | — | — | — | — | — | — | — | — |
| Sol 3 (solid content: 28.80 mass %) | — | — | — | — | 2.083 | — | — | — | — | — | — | — | — | — | — | — |
| CN991NS | 2.500 | 2.350 | 2.350 | 2.350 | 2.350 | 2.450 | 2.400 | 2.300 | 2.250 | 2.000 | 2.350 | 2.350 | 2.350 | 2.350 | 2.350 | 2.500 |
| Viscoat (trade name) 196 | 6.500 | 4.656 | 4.637 | 4.656 | 4.637 | 5.879 | 5.258 | 4.016 | 3.395 | 0.289 | 4.637 | 4.637 | 4.637 | 4.637 | 4.637 | 5.500 |
| NOAA | 1.000 | 0.940 | 0.940 | 0.940 | 0.940 | 0.980 | 0.960 | 0.920 | 0.900 | 0.800 | 0.940 | 0.940 | 0.940 | 0.940 | 0.940 | — |
| MEDOL-10 | — | — | — | — | — | — | — | — | — | — | — | — | — | — | — | 2.000 |
| Omnirad (trade name) 184 | 1.000 | 1.000 | 1.000 | 1.000 | 1.000 | 1.000 | 1.000 | 1.000 | 1.000 | 1.000 | 1.000 | 1.000 | 1.000 | 1.000 | 1.000 | 1.000 |
| TEGO (trade name) Rad 2250 | 0.010 | — | 0.010 | 0.010 | 0.010 | 0.010 | 0.010 | 0.010 | 0.010 | 0.010 | — | — | — | — | — | — |
| BYK-UV3510 | — | — | — | — | — | — | — | — | — | — | 0.010 | — | — | — | — | — |
| BYK-UV3530 | — | — | — | — | — | — | — | — | — | — | — | 0.010 | — | — | — | — |
| BYK-UV3535 | — | — | — | — | — | — | — | — | — | — | — | — | 0.010 | — | — | — |
| TEGO (trade name) Flow 425 | — | — | — | — | — | — | — | — | — | — | — | — | — | 0.010 | 0.060 | 0.100 |
| Genorad (trade name) 22 | — | — | — | — | — | — | — | — | — | — | — | — | — | — | 0.050 | 0.100 |

Reference Example

COSMOSHINE (trade name) A4100, which was a PET substrate film having a thickness of 50 μm, was used.

Comparative Example 1

Using a #20 Meyer rod, the radiation-curable ink UV-C1 was coated on a primer-treated side of the COSMOSHINE (trade name) A4100, which was a substrate film having a thickness of 50 μm, and thus a coating layer having a thickness of approximately 10 μm was formed. The substrate film to which the coating layer was applied was passed through a UV irradiator (H-valve (DRS model) from Fusion UV System Inc.) twice in an air atmosphere, and the coating layer was cured. At this time, the coating layer was irradiated with UV light (UV-A) in conditions of an illuminance of 700 mW/cm$^2$ and an integrated light quantity of 900 mJ/cm$^2$. In this way, a laminate of Comparative Example 1 having a coating layer having a thickness of approximately 10 μm was prepared.

Comparative Example 2 and Examples 1 to 13

Laminates of Comparative Example 2 and Examples 1 to 13 were each prepared in the same manner as in Comparalaminate of Example 14 having an inkjet printing layer having a thickness of approximately 10 μm was prepared.

Comparative Example 3

A laminate of Comparative Example 3 was prepared in the same manner as in Example 14 except for changing the radiation-curable ink UV-E13 to UV-C3.

Figure 2B:
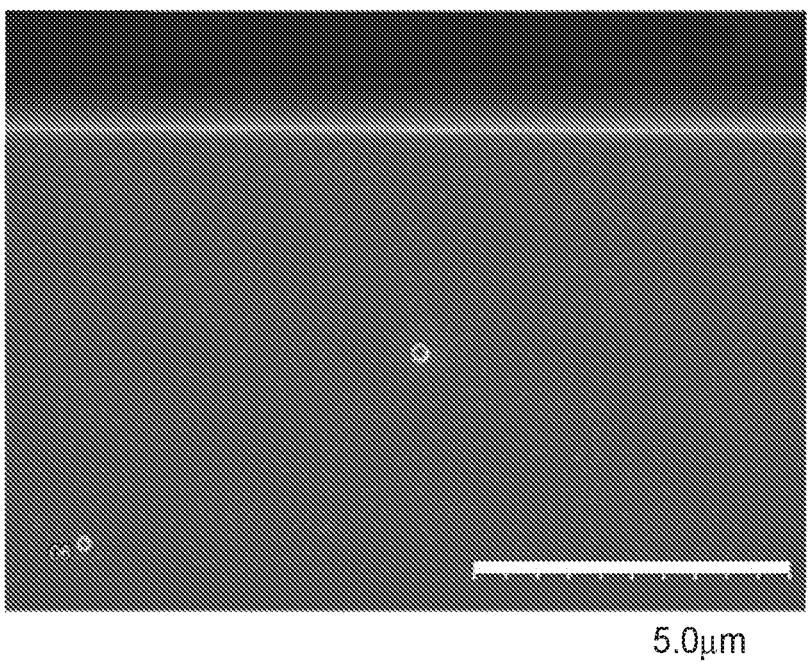
Figure 3A:
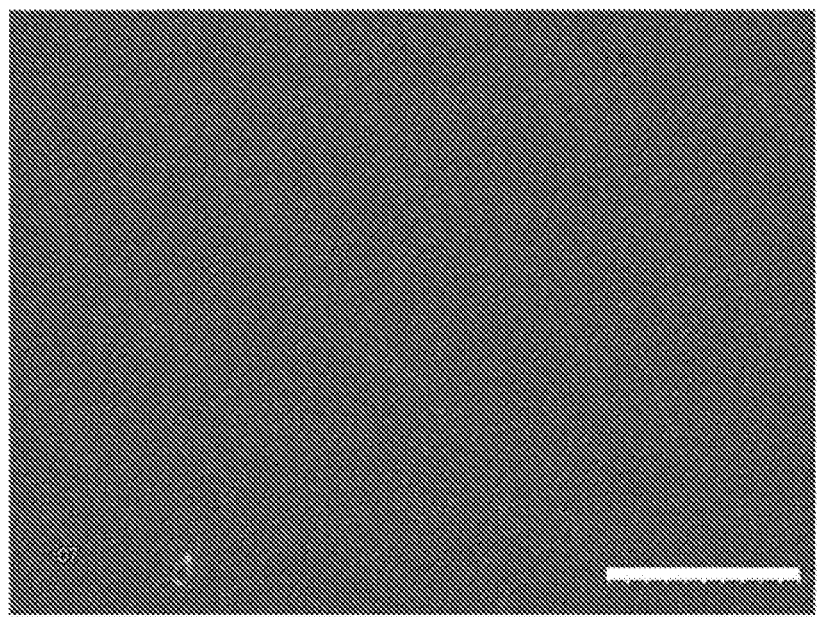
FIG. 3(a) is an SEM photograph of a laminate top face of Comparative Example 2 having a surface layer containing inorganic nanoparticles but no polyether-modified polymer and FIG. 3(b) is an SEM photograph of a surface layer cross section of the laminate of Comparative Example 2.
Figure 3B:
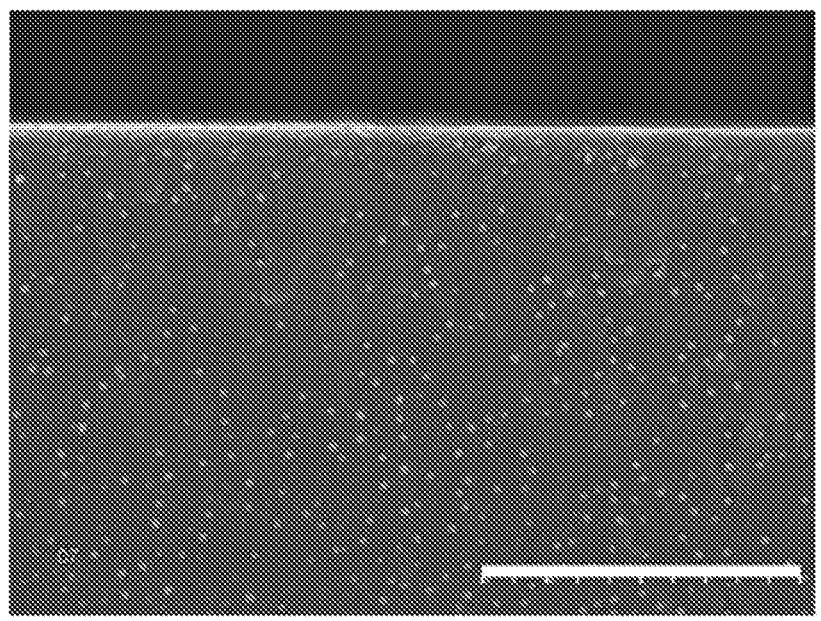
Figure 5A:
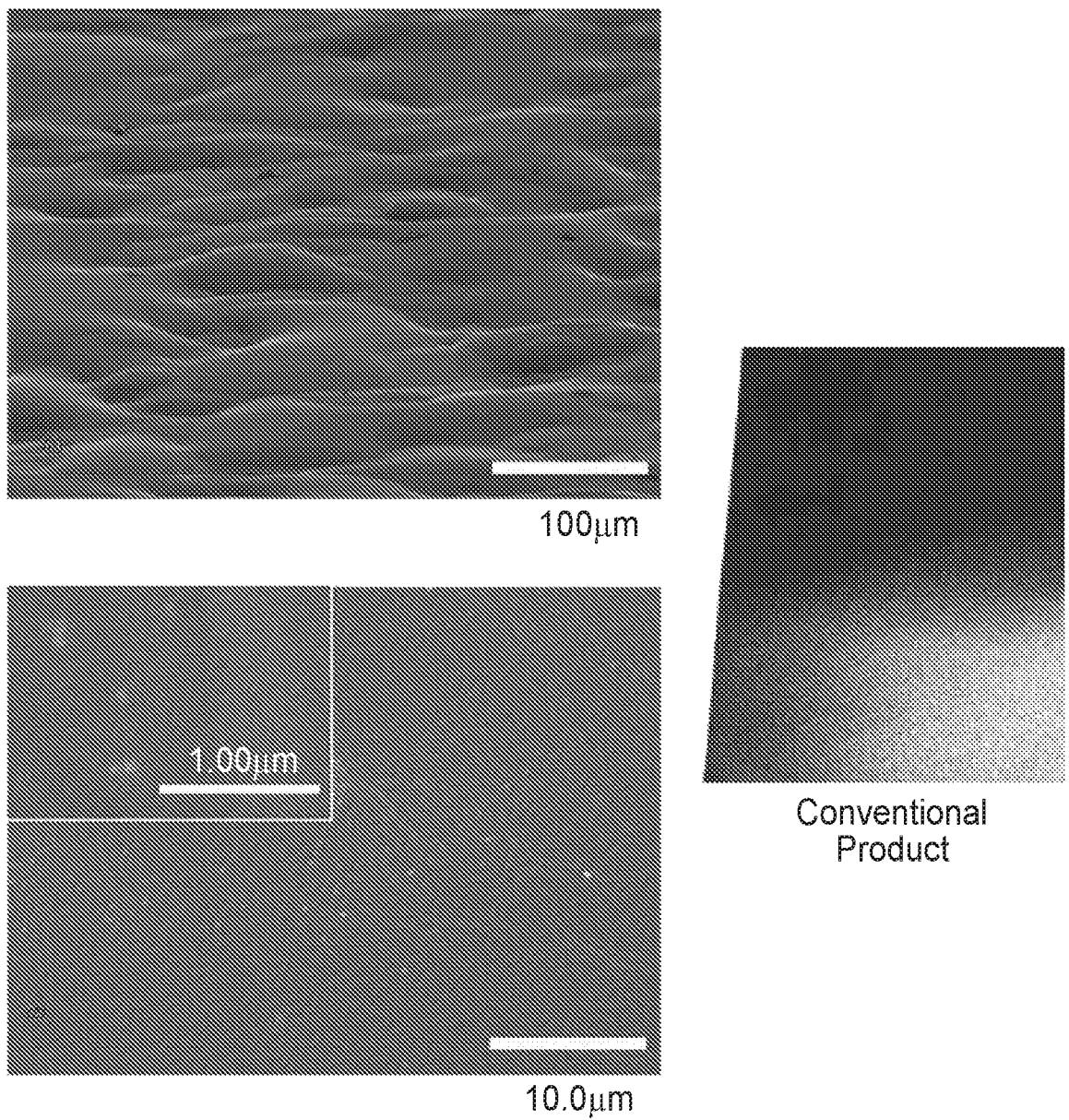
In FIG. 5(a), the upper left is an SEM photograph of a laminate surface of Comparative Example 3 having a protruded and recessed surface layer in the art prepared by using an inkjet ink containing no polyether-modified polymer and no inorganic nanoparticles, at an angle of inclination of 10°; the lower left is an SEM photograph of a top face of this protruded and recessed surface layer; and the right side is an optical photograph of the laminate surface of Comparative Example 3 having a protruded and recessed surface layer in the art.

The following evaluations were performed on the samples of Reference Example, Examples 1 to 14, and Comparative Examples 1 and 2, and the results are shown in Table 3-1 to Table 3-3. Here, "SiO2 particle content" in the tables is based on a total weight (dry coating amount) of a coating layer or an inkjet printing layer. Furthermore, scanning electron microscope photographs of the coating layers of the laminates of Comparative Examples 1 and 2 and Example 1 are shown in FIG. 2 to FIG. 4, and scanning electron microscope photographs and optical photographs of the inkjet printing layers of the laminates of Example 14 and Comparative Example 3 are shown in FIG. 5.

Initial Viscosity

The initial viscosity at 55° C. of the radiation-curable ink was measured by Discovery HR-2 (DHR-2) rheometer (available from TA Instruments) at a rotation speed of 150 times/min by using a 20 mm cone plate type parallel plate (available from TA Instruments).

Appearance Change after UV Irradiation

Presence or absence of appearance change before and after the UV irradiation of the coating layer or the inkjet printing layer was visually observed. The case where the gloss appearance of the coating layer or the inkjet printing layer was changed to a low gloss appearance after the UV irradiation was evaluated as "Yes", and the case where no change to a low gloss appearance was observed was evaluated as "No".

Surface Glossiness

The surface glossiness of each sample was measured by using Portable Gloss Meter BYK-Gardner Micro-tri-gloss (BYK-Chemie Japan K.K.) at measurement angles of 20°, 60°, and 80°, in accordance with JIS Z 8741.

Adhesion

The adhesion performance between the substrate film and the coating layer or inkjet printing layer was evaluated according to the cross-cut method in accordance with JIS K 5600. Here, a 5×5 grid with a grid spacing of 1 mm and Cellotape (trade name) CT-24 (available from Nichiban Co., Ltd.) were employed. The case where no peeling and/or no breaking occurred in the coating layer or the inkjet printing layer was evaluated as "Good", and the case where peeling and/or breaking occurred was evaluated as "Poor".

TABLE 3-1

|  |  | Ref Ex | Comparative Ex 1 | Comparative Ex 2 | Ex 1 | Ex 2 | Ex 3 |
|---|---|---|---|---|---|---|---|
| Radiation-curable ink | | — | UV-C1 | UV-C2 | UV-E1 | UV-E2 | UV-E3 |
| $SiO_2$ particle content (mass %) | | — | 0 | 6 | 6 | 6 | 6 |
| Evaluation result | Initial viscosity (mPa·s) | — | 6.5 | 7.2 | 14.3 | 31.7 | 12.7 |
| | Appearance change after UV irradiation | — | No | No | Yes | Yes | Yes |
| | Surface 20° | 28.4 | 34.4 | 21.6 | 1.9 | 2.2 | 3.1 |
| | Glossiness 60° | 125.0 | 105.0 | 103.0 | 11.2 | 9.6 | 15.8 |
| | (GU) 80° | 98.0 | 96.7 | 95.5 | 59.7 | 65.2 | 79.7 |
| | Adhesion | — | Good | Good | Good | Good | Good |

TABLE 3-2

|  |  | Comparative Ex 1 | Ex 4 | Ex 5 | Ex 1 | Ex 6 | Ex 7 | Ex 8 |
|---|---|---|---|---|---|---|---|---|
| Radiation-curable ink | | UV-C1 | UV-E4 | UV-E5 | UV-E1 | UV-E6 | UV-E7 | UV-E8 |
| $SiO_2$ particle content (mass %) | | 0 | 2 | 4 | 6 | 8 | 10 | 20 |
| Evaluation result | Initial viscosity (mPa·s) | 6.5 | Not measured | Not measured | 14.3 | Not measured | Not measured | Not measured |
| | Appearance change after UV irradiation | No | Yes | Yes | Yes | Yes | Yes | Yes |
| | Surface 20° | 34.4 | 7.8 | 4.2 | 1.9 | 1.6 | 1.9 | 2.0 |
| | Glossiness 60° | 105.0 | 48.0 | 22.5 | 11.2 | 9.1 | 12.2 | 14.4 |
| | (GU) 80° | 96.7 | 65.5 | 52.2 | 59.7 | 61.5 | 60.2 | 80.0 |
| | Adhesion | Good | Good | Good | Good | Good | Good | Good |

TABLE 3-3

|  |  | Ex 9 | Ex 10 | Ex 11 | Ex 12 | Ex 13 | Ex 14 |
|---|---|---|---|---|---|---|---|
| Radiation-curable ink | | UV-E9 | UV-E10 | UV-E11 | UV-E12 | UV-E13 | UV-E14 |
| $SiO_2$ particle content (mass %) | | 5 | 5 | 6 | 6 | 6 | 6 |
| Evaluation result | Initial viscosity (mPa·s) | 12.8 | 17.6 | 17.4 | 10.4 | 8.2 | 8.2 |
| | Appearance change after UV irradiation | Yes | Yes | Yes | Yes | Yes | Yes |
| | Surface 20° | 3.2 | 2.8 | 1.9 | 2.8 | 3.0 | 0.8 |
| | Glossiness 60° | 20.0 | 16.1 | 11.4 | 19.4 | 18.4 | 9.2 |
| | (GU) 80° | 34.5 | 59.1 | 60.0 | 77.0 | 79.3 | 17.0 |
| | Adhesion | Good | Good | Good | Good | Good | Good |

REFERENCE SIGNS LIST

100 Laminate before irradiation
101 Substrate
102 Surface layer before irradiation
103 Inorganic nanoparticle
104 Binder resin
105 Surface layer after irradiation
110 Laminate after irradiation

What is claimed is:

1. A laminate comprising:
a substrate, and
a surface layer having a 60° surface glossiness of 50.0 GU or less, the surface layer comprising a cured product of a radiation-curable ink, the radiation-curable ink comprising silica nanoparticles,
a polyether-modified polymer,
a radiation-curable bifunctional polymerizable oligomer, and
a compound of Formula (I)

$$R^1\text{-}R^2\text{---}Si(OR^3)_3 \quad \text{Formula (1)}$$

wherein
$R^1$ is an acryloyl group or a methacryloyl group,
$R^2$ is an alkylene group having from 5 to 12 carbon atoms, and
$R^3$ is an alkyl group having from 1 to 4 carbon atoms,
wherein the surface layer comprises aggregated or gathered silica nanoparticles.

2. The laminate according to claim 1, wherein the radiation-curable ink further comprises a radiation curable monofunctional polymerizable monomer.

3. The laminate according to claim 1, wherein the compound represented by Formula (1) is 8-(meth)acryloxyoctyltrimethoxysilane.

4. The laminate according to claim 1, wherein the radiation-curable ink further contains an optional non-functional silane coupling agent.

5. The laminate according to claim 1, wherein the radiation-curable bifunctional polymerizable oligomer is a bifunctional urethane (meth)acylate oligomer.

6. The laminate according to claim 4, wherein a compounded amount of each of the compound represented by Formula (1) and the optional non-functional silane coupling agent is in a range from 0.030 to 0.090 mmol per 1 g of the silica nanoparticles.

7. The laminate according to claim 1, wherein the silica nanoparticles are contained in a proportion from 2 to 20 mass % relative to a total weight of the surface layer.

8. The laminate according to claim 1, wherein an average particle size of the silica nanoparticles is 5 nm or greater and 150 nm or less.

9. The laminate according to claim 1, wherein the laminate is used for decoration.

10. A radiation-curable ink comprising
silica nanoparticles,
a polyether-modified polymer,
a radiation-curable bifunctional polymerizable oligomer, and
a compound of Formula (I)

$$R^1\text{-}R^2\text{---}Si(OR^3)_3 \quad \text{Formula (1)}$$

wherein
$R^1$ is an acryloyl group or a methacryloyl group,
$R^2$ is an alkylene group having from 5 to 12 carbon atoms, and
$R^3$ is an alkyl group having from 1 to 4 carbon atoms,
wherein the silica nanoparticles form aggregation or gathering after curing.

11. The radiation-curable ink according to claim 10, wherein the ink further comprises a radiation curable monofunctional polymerizable monomer.

12. The radiation-curable ink according to claim 10, wherein the compound represented by Formula (1) is 8-(meth)acryloxyoctyltrimethoxysilane.

13. The radiation-curable ink according to claim 10, further comprising an optional non-functional silane coupling agent.

14. The radiation-curable ink according to claim 10, wherein the radiation-curable bifunctional polymerizable oligomer is a bifunctional urethane (meth)acrylate oligomer.

15. The ink according to claim 13, wherein a compounded amount of each of the compound represented by Formula (1) and the optional non-functional silane coupling agent is in a range of from 0.030 to 0.090 mmol per 1 g of the silica nanoparticles.

16. The ink according to claim 10, wherein a content of a solvent is 5 mass % or less.

* * * * *